United States Patent
Ikai

(10) Patent No.: US 10,034,012 B2
(45) Date of Patent: Jul. 24, 2018

(54) PREDICTION IMAGE GENERATION DEVICE, MOVING IMAGE DECODING DEVICE, AND MOVING IMAGE CODING DEVICE

(75) Inventor: Tomohiro Ikai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 636 days.

(21) Appl. No.: 13/697,261

(22) PCT Filed: Apr. 28, 2011

(86) PCT No.: PCT/JP2011/060428
§ 371 (c)(1),
(2), (4) Date: Nov. 9, 2012

(87) PCT Pub. No.: WO2011/142277
PCT Pub. Date: Nov. 17, 2011

(65) Prior Publication Data
US 2013/0058417 A1    Mar. 7, 2013

(30) Foreign Application Priority Data
May 13, 2010 (JP) ................................. 2010-111476

(51) Int. Cl.
*H04N 7/36* (2006.01)
*H04N 19/513* (2014.01)
*H04N 19/105* (2014.01)
*H04N 19/139* (2014.01)
*H04N 19/176* (2014.01)

(52) U.S. Cl.
CPC ......... *H04N 19/513* (2014.11); *H04N 19/105* (2014.11); *H04N 19/139* (2014.11); *H04N 19/176* (2014.11)

(58) Field of Classification Search
CPC .. H04N 19/105; H04N 19/513; H04N 19/176; H04N 19/139
USPC .................... 375/240.16, 240.12, E07.256
See application file for complete search history.

(56) References Cited

U.S. PATENT DOCUMENTS 5,412,435 A * 5/1995 Nakajima ..................... 348/699
6,404,813 B1* 6/2002 Haskell et al. ........... 375/240.12
8,290,055 B2* 10/2012 Ameres et al. .......... 375/240.16
(Continued)

FOREIGN PATENT DOCUMENTS

JP    2004-194285 A    7/2004
JP    2004-242276 A    8/2004
(Continued)

OTHER PUBLICATIONS

"Recommendation ITU-T H.264", Telecommunication Standardization Sector of ITU, 2010, pp. 160, 171-174*.

*Primary Examiner* — Andy Rao
*Assistant Examiner* — Zaihan Jiang
(74) *Attorney, Agent, or Firm* — Birch, Stewart, Kolasch & Birch, LLP

(57) ABSTRACT

An inter-predicted image generation section (16) of a moving image decoder (1) includes a weighting factor calculation section (16b) for setting the value of the weighting factor $w_2$ such that a relation $0<|w_2-0.5|<|tb/td-0.5|$ is met, wherein td represents an inter-frame distance between the decoded image $P_1$ and the decoded image $P_2$ and tb represents a distance between the decoded image $P_1$ and the decoded image P.

5 Claims, 19 Drawing Sheets

(56) References Cited

U.S. PATENT DOCUMENTS

| | | | |
|---|---|---|---|
| 2004/0057523 A1* | 3/2004 | Koto | H04B 1/662 375/240.26 |
| 2005/0047506 A1 | 3/2005 | Kadono et al. | |
| 2005/0105809 A1 | 5/2005 | Abe et al. | |
| 2006/0067406 A1 | 3/2006 | Kitada et al. | |
| 2006/0198440 A1* | 9/2006 | Yin | H04N 19/105 375/240.12 |
| 2007/0019114 A1* | 1/2007 | de Garrido et al. | 348/701 |
| 2008/0063288 A1 | 3/2008 | Abe et al. | |
| 2008/0063291 A1 | 3/2008 | Abe et al. | |
| 2008/0069461 A1 | 3/2008 | Abe et al. | |
| 2008/0069462 A1 | 3/2008 | Abe et al. | |
| 2008/0247462 A1* | 10/2008 | Demos | 375/240.03 |
| 2009/0110072 A1 | 4/2009 | Kadono et al. | |
| 2010/0074332 A1* | 3/2010 | Karczewicz et al. | 375/240.12 |
| 2010/0128792 A1* | 5/2010 | Saito | H04N 19/105 375/240.16 |
| 2010/0195723 A1* | 8/2010 | Ikai | H04N 19/105 375/240.12 |
| 2010/0266011 A1 | 10/2010 | Kadono et al. | |
| 2010/0329350 A1 | 12/2010 | Abe et al. | |
| 2011/0188576 A1* | 8/2011 | Clerckx et al. | 375/240.16 |
| 2011/0235708 A1* | 9/2011 | Kim et al. | 375/240.12 |
| 2011/0293007 A1 | 12/2011 | Abe et al. | |
| 2012/0195514 A1 | 8/2012 | Abe et al. | |

FOREIGN PATENT DOCUMENTS

| | | |
|---|---|---|
| JP | 2006-101322 A | 4/2006 |
| JP | 2007-081518 A | 3/2007 |
| WO | WO 2009/041215 A1 | 4/2009 |

\* cited by examiner

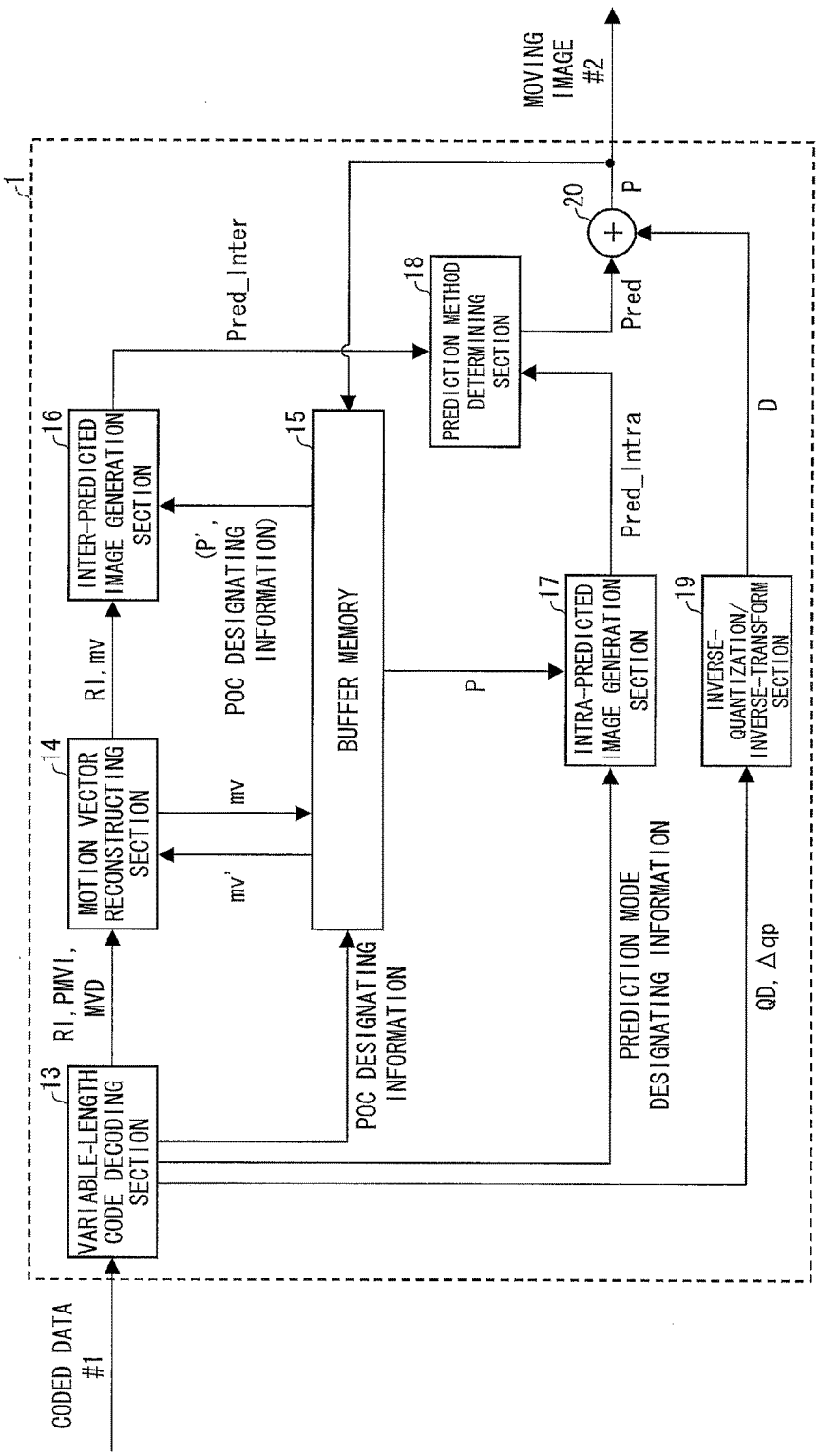

F I G. 3
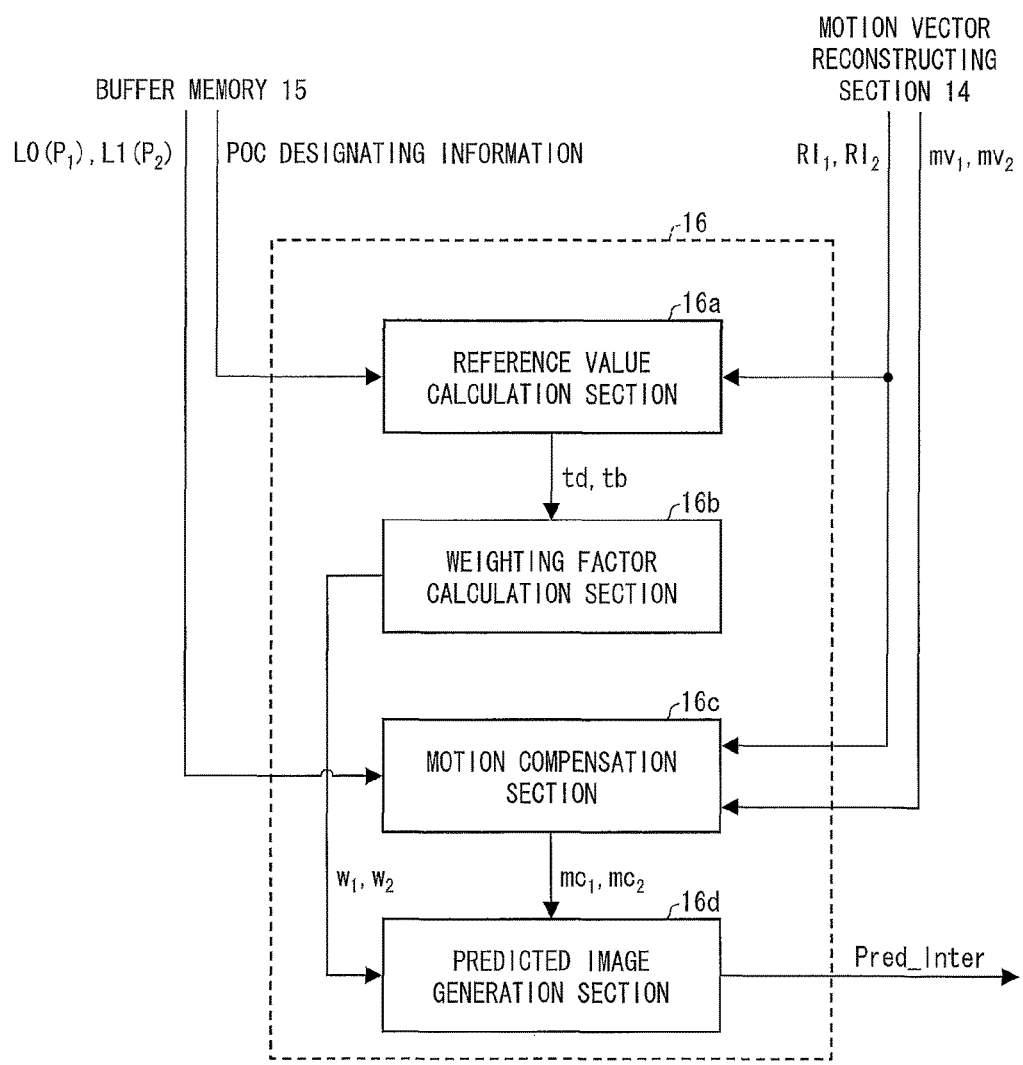

F I G. 9
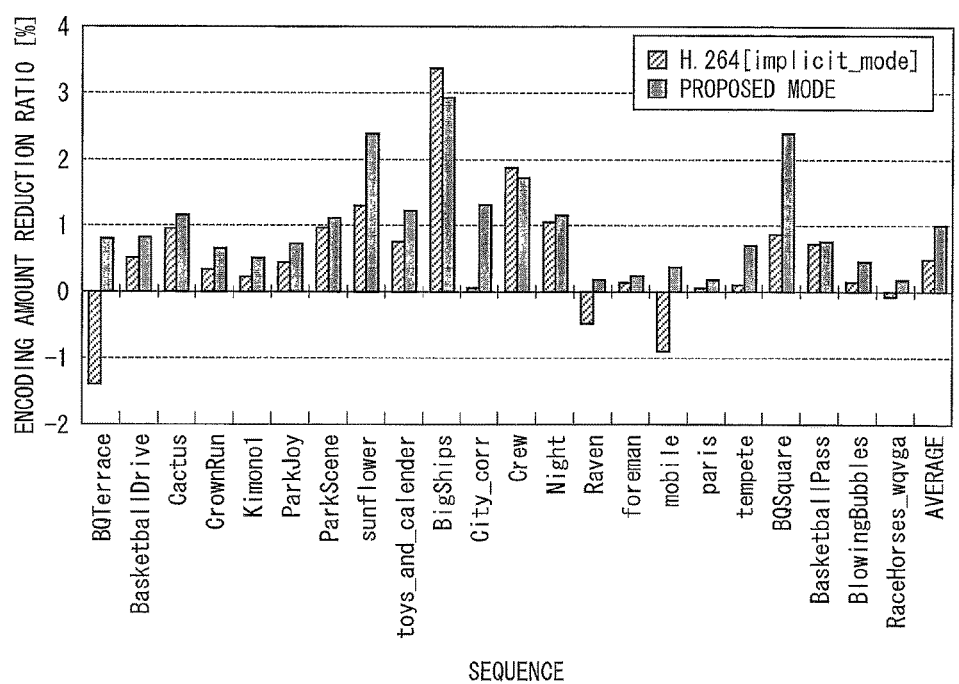

F I G. 1 2
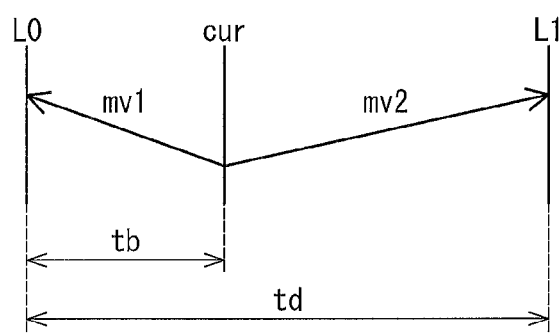

F I G. 1 7
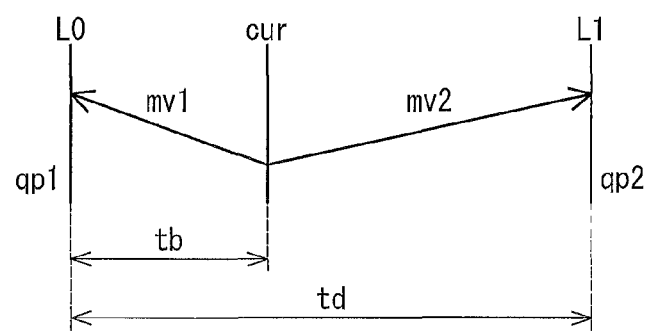

PREDICTION IMAGE GENERATION DEVICE, MOVING IMAGE DECODING DEVICE, AND MOVING IMAGE CODING DEVICE

TECHNICAL FIELD

The present invention relates to a prediction image generation device for generating a predicted image by adding an offset value to a weighted average of a motion compensated image generated from decoded images. Further, the present invention relates to a moving image decoder and a moving image encoder each including such a predicted image generation device.

BACKGROUND ART

A moving image encoder for encoding a moving image and a moving image decoder for decoding a moving image are in wide use in order to transmit or record a moving image efficiently. Typical examples of a moving image encoding method include H.264/MPEG-4 AVC (described in Non-patent Literature 1) and a method employed in KTA software which is a joint development codec in VCEG (Video Coding Expert Group).

In such an encoding method, pictures constituting a moving image are managed in a hierarchical structure constituted by (i) slices into which each of the pictures is divided, (ii) macroblocks into which each of the slices is divided, and (iii) subblocks into which each of the macroblocks is divided.

The moving image encoder encodes a moving image with respect to each block. Specifically, encoding is conducted by: (1) carrying out, with respect to each block, DCT (Discrete Cosine Transform) on a prediction residual obtained by subtracting a predicted image from an original image; (2) quantizing a DCT coefficient thus obtained; and (3) carrying out variable length coding on the quantized DCT coefficient. Generally, it is possible to reduce a coding amount by carrying out DCT/quantization/encoding on a prediction residual, but not on an original image.

The moving image encoder generates the predicted image in accordance with a locally decoded image obtained by carrying out inverse quantization/inverse DCT with respect to the quantized DCT coefficient. Examples of a method for generating a predicted image include an inter-frame prediction (inter-prediction) and an intra-frame prediction (intra-prediction). In the moving image encoder, it is selected per macro block which prediction method is to be used.

In the intra-prediction, a predicted image in a partition is generated by extrapolating from a locally decoded image in another encoded/decoded partition (hereinafter referred to as "reference partition") which belongs to the same picture as the partition. On the other hand, in the inter-prediction, a predicted image in a partition is generated by carrying out motion compensated prediction from another encoded/decoded picture (hereinafter referred to as "reference image") which is different from a picture to which the partition belongs. Note here that a partition is indicative of a prediction unit obtained by dividing a macroblock.

Further, in the inter-prediction of H.264/MPEG-4 AVC, it is possible to carry out weighted prediction in which an image obtained by adding on offset value to an weighted average $w_1 \times mc_1 + w_2 \times mc_2$ of motion compensated images $mc_1$ and $mc_2$ generated from reference images (locally decoded images) $P_1$ and $P_2$ respectively is used as a predicted image to be subtracted from an encoding target image. The weighted prediction has an Explicit mode and an Implicit mode. In the moving image encoder, it can be selected per partition which mode is to be used.

In the Explicit mode, weighting factors $w_1$ and $w_2$ are encoded in the moving image encoder, and are decoded in the moving image decoder. On the other hand, in the Implicit mode, in both of the moving image encoder and the moving image decoder, the weighting factors $w_1$ and $w_2$ are set in accordance with inter-frame distances between a prediction target image (that is, an encoding target image in the moving image encoder, and a decoding target image in the moving image decoder) P and the reference images (that is, locally decoded images in the moving image encoder, and decoded images in the moving image decoder) $P_1$ and $P_2$. Specifically, assume that an inter-frame distance between the reference image $P_1$ and the reference image $P_2$ is set to td, and a distance between the reference image $P_1$ and the prediction target image P is set to tb. Under this condition, a value of the weighting factor $w_2$ by which the motion compensated image $mc_2$ generated from the reference image $P_2$ is to be multiplied is set to tb/td, and a value of the weighting factor $w_1$ by which the motion compensated image $mc_1$ generated from the reference image $P_1$ is to be multiplied is set to $1-w_2$.

When Implicit mode weighted prediction is carried out, that is, when values of the weighting factors $w_1$ and $w_2$ are set to $w_1=1-w_2$ and $w_2=tb/td$, it is possible to generate a more accurate predicted image (with a smaller difference from an encoding target image) in comparison with a case where no weighted prediction is carried out, that is, a case where values of the weighting factors $w_1$ and $w_2$ are set to $w_1=w_2=0.5$. This allows reducing codes in comparison with a case where no weighted prediction is carried out.

CITATION LIST

Non-Patent Literature

[Non-Patent Literature 1]
"Recommendation ITU-T H.264", Telecommunication Standardization Sector of ITU, 03/2009

SUMMARY OF INVENTION

Technical Problem

However, the inventor has found out sequences in which a coding amount is increased by carrying out conventional Implicit mode weighted prediction. Specifically, the inventor has examined 23 kinds of sequences widely used to evaluate encoding performance, in terms of a coding amount reduction ratio at Implicit mode weighted prediction, and have found out that the coding amount is increased in three kinds of sequences called "BQTerrace", "mobile", and "Raven".

FIG. 20 shows results of evaluation on a coding amount reduction ratio at Implicit mode weighted prediction. Note that the coding amount reduction ratio at Implicit mode weighted prediction is indicated by a percentage of a ratio (A−B)/A wherein A is a coding amount in a case where no weighted prediction is carried out (that is, the values of the weighting factors $w_1$ and $w_2$ are set to $w_1=w_2=0.5$) and B is a coding amount in a case where Implicit mode weighted prediction is carried out (that is, the values of the weighting factors $w_1$ and $w_2$ are set to $w_1=1-w_2$, $w_2=tb/td$). Note that A and B are coding amounts standardized so that an SN ratio (PSNR) at a time of carrying out no weighted prediction and an SN ratio (PSNR) at a time of carrying out Implicit mode weighted prediction are equal to each other.

Implicit mode weighted prediction has a side effect of lowering an effect of cancelling coding noise (quantization noise). Generally, the coding noise is evenly included in the motion compensated images $mc_1$ and $mc_2$. Thus, when the values of the weighting factors $w_1$ and $w_2$ are set to be equal to each other and a weighted average $w_1 \times mc_1 + w \times mc_2$ is obtained, the coding noise is canceled. However, when the values of the weighting factors $w_1$ and $w_2$ are set to $w_1=1-w_2$, $w_2=tb/td$, the coding noise is not cancelled sufficiently and remains in a predicted image. Therefore, whether a coding amount is reduced when Implicit mode weighted prediction is carried out depends on a magnitude relation between a degree of reduction in a coding amount due to improved prediction accuracy and a degree of increase in a coding amount due to remaining coding noise.

The weighting factor of Implicit mode weighted prediction is a weighting factor which is most suitable (whose prediction is most accurate) in a case where a constant time variation occurring in a fade or a dissolve is compensated. Therefore, in a case where a time variation is steady, reduction in a coding amount due to improved prediction accuracy exceeds increase in a coding amount due to remaining coding noise, and consequently a coding amount decreases as a whole. On the other hand, in a case where a time variation is not steady, reduction in a coding amount due to improved prediction accuracy falls below increase in a coding amount due to remaining coding noise, and consequently, in some cases, a coding amount can increase as a whole. It is considered that increase in a coding amount in the three kinds of sequences is caused in such a way.

The present invention was made in view of the above problems, and an object of the present invention is, in a predicted image generation device and a predicted image generation method in each of which a predicted image is generated by adding an offset value to a weighted average of a motion compensated image generated from reference images, to reduce possibilities of increase in a coding amount in a sequence in which a time variation is not steady and to achieve more stable and highly efficient encoding.

Solution to Problem

A predicted image generation device of the present invention includes: motion compensated image generation means for generating, using decoded images $P_1$ and $P_2$ as reference images, motion compensated images $mc_1$ and $mc_2$ with respect to a decoded image P; weighting factor setting means for setting values of weighting factors $w_1$ and $w_2$ by which the motion compensated images $mc_1$ and $mc_2$ generated by the motion compensated image generation means are to be multiplied, respectively; and predicted image generation means for generating a predicted image Pred with respect to the decoded image P by adding an offset value to an weighted average $w_1 \times mc_1 + w_2 \times mc_2$ of the motion compensated images $mc_1$ and $mc_2$ generated by the motion compensated image generation means, the weighted average $w_1 \times mc_1 + w_2 \times mc_2$ being calculated using the weighting factors $w_1$ and $w_2$ that are set by the weighting factor setting means.

Furthermore, a method of the present invention for generating a predicted image includes the steps of: (i) generating, using decoded images $P_1$ and $P_2$ as reference images, motion compensated images $mc_1$ and $mc_2$ with respect to a decoded image P; (ii) setting values of weighting factors $w_1$ and $w_2$ by which the motion compensated images $mc_1$ and $mc_2$ generated in the step (i) are to be multiplied, respectively; and (iii) generating a predicted image Pred with respect to the decoded image P by adding an offset value to an weighted average $w_1 \times mc_1 + w_2 \times mc_2$ of the motion compensated images $mc_1$ and $mc_2$ generated in the step (i), the weighted average $w_1 \times mc_1 + w_2 \times mc_2$ being calculated using the weighting factors $w_1$ and $w_2$ that are set in the step (ii).

In order to solve the foregoing problem, the predicted image generation device of the present invention is designed such that the weighting factor setting means sets the value of the weighting factor $w_2$ such that a relation $0<|w_2-0.5|<|tb/td-0.5|$ is met, wherein td represents an inter-frame distance between the decoded image $P_1$ and the decoded image $P_2$ and tb represents a distance between the decoded image $P_1$ and the decoded image P.

Furthermore, in order to solve the foregoing problem, the method of the present invention for generating a predicted image is designed such that in the step (ii), the value of the weighting factor $w_2$ is set such that a relation $0<|w_2-0.5|<|tb/td-0.5|$ is met, wherein td represents an inter-frame distance between the decoded image $P_1$ and the decoded image $P_2$ and tb represents a distance between the decoded image $P_1$ and the decoded image P.

With the arrangement, the weighting factor $w_2$ is set such that the relation $0<|w_2-0.5|<|tb/td-0.5|$ is met. This allows for (1) generating a predicted image with higher accuracy than a configuration in which the value of the weighting factor $w_2$ is set to 0.5 with disregard to an inter-frame distance, and (2) generating a predicted image with a smaller amount of coding noise than a configuration in which the value of the weighting factor $w_2$ is set to tb/td in consideration of an inter-frame distance only. This yields an effect of reducing the possibility that prediction may increase the coding amount when a prediction residual obtained by subtracting a predicted image from an encoded target image is encoded.

The weighting factor w2 by which the motion compensated image $mc_2$ is to be finally multiplied should meet the condition $0<|w_2-0.5|<|tb/td-0.5|$. For example, in a configuration in which a pixel value obtained by adding an offset value to the weighted average $w_1 \times mc_1 + w_2 \times mc_2$ using integer factors $w_1$ and $w_2$ is divided by a constant C to obtain a pixel value of a predicted image, the weighting factor $w_2'=w_2/C$ should meet the condition $0<|w_2-0.5|<|tb/td-0.5|$.

The offset value may be set to 0. That is, a configuration in which no offset value is added substantially is also encompassed in the scope of the present invention.

Advantageous Effects of Invention

The present invention yields an effect of reducing the possibility that when a prediction residual obtained by subtracting a predicted image from an encoding target image is encoded, prediction increases a coding amount.

BRIEF DESCRIPTION OF DRAWINGS

FIG. 1 is a block diagram showing a configuration of a moving image decoder in accordance with First Embodiment.

FIG. 3 is a block diagram showing a configuration of an inter-predicted image generation section of the moving image decoder shown in FIG. 1.

FIG. 9 is a graph showing a coding amount reduction ratio in each sequence of coded data encoded by the moving image encoder shown in FIG. 7.

FIG. 12 is a view showing an example of a motion vector mv1 used in motion compensation referring to a reference image L0 and an example of a motion vector mv2 used in motion compensation referring to a reference image L1.

FIG. 17 is a view showing an example of a motion vector mv1 used in motion compensation referring to a reference image L0 and an example of a motion vector mv2 used in motion compensation referring to a reference image L1.

DESCRIPTION OF EMBODIMENTS

First Embodiment (Configuration of Coded Data)

Prior to explaining a moving image encoder 2 and a moving image decoder 1 in accordance with the present embodiment, an explanation is made as to a data structure of coded data which is generated by the moving image encoder 2 and decoded by the moving image decoder 1. The coded data which is generated by the moving image encoder 2 and decoded by the moving image decoder 1 includes a hierarchical structure consisting of a sequence layer, a GOP (Group of Pictures) layer, a picture layer, a slice layer, and a macroblock layer.

Figure 2:
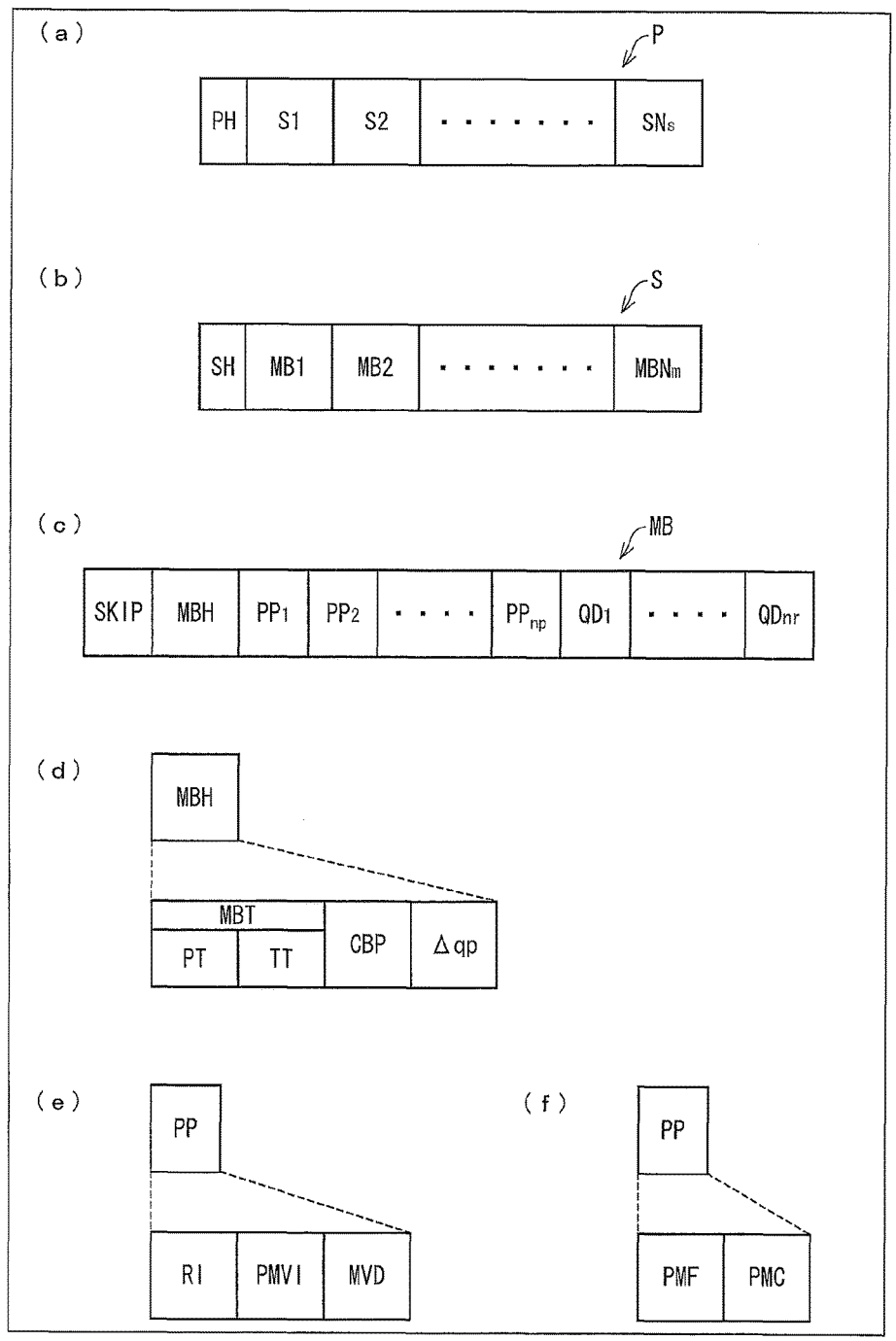
FIG. 2 is a view showing a configuration of coded data decoded by the moving image decoder shown in FIG. 1. (a) of FIG. 2 shows a configuration of a picture layer in the coded data. (b) of FIG. 2 shows a configuration of a slice layer included in the picture layer. (c) of FIG. 2 shows a configuration of a macroblock layer included in the slice layer. (d) of FIG. 2 shows a configuration of a partition layer which is included in the macroblock layer and which regards a partition to which inter-prediction is applied. (e) of FIG. 2 shows a configuration of a partition layer which is included in the macroblock layer and which regards a partition to which intra-prediction is applied.

FIG. 2 shows a structure of coded data of the picture layer and subsequent layers. (a) to (f) of FIG. 2 show a picture layer P, a slice layer S, a macroblock layer MB, a macroblock header MBH, a prediction parameter PP of an inter-prediction partition, and a prediction parameter PP of an intra-prediction partition.

The picture layer P is a set of data referred to by the moving image decoder 1 in order to decode a corresponding picture. As shown in (a) of FIG. 2, the picture layer P includes a picture header PH and slice layers $S_1$ to $S_{Ns}$ (Ns indicates the total number of slice layers included in the picture layer P).

The picture header PH includes a coding parameter group referred to by the moving image decoder 1 in order to determine how to decode a corresponding picture. For example, coding mode information (entoropy_coding_mode_flag) indicative of the mode of variable length coding employed by the moving image encoder 2 in encoding is an example of the coding parameters included in the picture header PH.

Each of the slice layers S included in the picture layers P is a set of data referred to by the moving image decoder 1 in order to decode a corresponding slice. As shown in (b) of FIG. 2, each slice layer S includes a slice header SH and macroblock layers $MB_1$ to $MB_{Nm}$ (Nm indicates the total number of macroblocks included in the slice S).

The slice header SH includes a coding parameter group referred to by the moving image decoder 1 in order to determine how to decode a corresponding slice. Examples of the coding parameters included in the slice header SH include (1) slice-type designating information (slice_type) for designating a slice type, (2) POC designating information (e.g. pic_order_cnt_lbs, delta_pic_order_cnt etc.) for designating the order of displaying pictures (POC: Picture Order Count) including corresponding slices, and (3) weighting factor designating information (pred_weight_table) for designating a weighting factor employed by the moving image encoder 2 in encoding.

Examples of the slice type which can be designated by the slice-type designating information include (1) an I slice using only an intra-prediction in encoding, (2) a P slice using unidirectional prediction or bidirectional prediction in encoding, and (3) a B slice using unidirectional prediction, bidirectional prediction, or intra-prediction in encoding.

Each of the macroblock layers MB included in the slice layer S is a set of data referred to by the moving image decoder 1 in order to decode a corresponding macroblock. As shown in (c) of FIG. 2, each macroblock layer MB includes a skip flag SKIP, a macroblock header MBH, prediction parameters $PP_1$ to $PP_{Np}$, and quantization prediction errors $QD_1$ to $QD_{Nb}$. Here, Np indicates the total number of partitions (prediction unit) included in a corresponding macroblock, and Nb indicates the total number of blocks (transform unit) included in a corresponding macroblock. In a case where the value of the skip flag SKIP is 1, i.e. the corresponding macroblock is a skip block, the macroblock header MBH, the prediction parameters $PP_1$ to $PP_{NP}$, and quantization prediction errors $QD_1$ to $QD_{Nb}$ in the macroblock layer are omitted.

The macroblock header MBH includes a coding parameter referred to by the moving image decoder 1 in order to determine how to decode a corresponding macroblock. Specifically, as shown in (d) of FIG. 2, the macroblock header MBH includes macroblock-type designating information MBT (mb_type) for designating the macroblock type of the corresponding macroblock, CBP (coded_block_pattern) for designating a coded bock pattern, and a quantization parameter difference Δqp (mb_qp_delta) for designating the size of a quantization step. The macroblock-type designating information MBT includes prediction unit designating information PT and transform unit designating information TT.

The prediction unit designating information PT designates a pattern of dividing the corresponding macroblock into partitions (prediction unit) and a method for prediction (L0 unidirectional prediction, L1 unidirectional prediction, bidirectional prediction etc.) employed when the moving image encoder 2 generates predicted images in individual partitions. The partition is a square region of 16×16 pixels, 8×8 pixels, or 4×4 pixels, or an oblong region of 16×8 pixels, 8×16 pixels, 8×4 pixels, or 4×8 pixels. On the other hand, the transform unit designating information TT designates a pattern of dividing the corresponding macroblock into blocks (transform unit). The block is a square region of 16×16 pixels, 8×8 pixels, or 4×4 pixels.

The above explanation shows, as an example, the partition when the macroblock is a square region of 16×16 pixels. However, the present invention is not limited to this. For example, with respect to a macroblock of 64×64 pixels, usable partitions include a square region of 64×64 pixels or 32×32 pixels, or an oblong region of 64×32 pixels, 32×64 pixels, 32×16 pixels, or 16×32 pixels.

The quantization parameter difference Δqp is a difference qp−qp' between a quantization parameter qp of the corresponding macroblock and a quantization parameter qp' of a macroblock encoded immediately before the macroblock.

The quantization prediction residuals QDn included in the macroblock layer MB are coded data generated by the moving image encoder 2 subjecting the corresponding block to Processes 1 to 3 below. Process 1: subtract a predicted image from an encoding target image to obtain a prediction residual and subject the prediction residual to DCT (Discrete Cosine Transform). Process 2: quantize DCT coefficient obtained in the Process 1. Process 3: subject the DCT coefficient quantized in the Process 2 to variable length coding. The aforementioned quantization parameter qp indicates the size of a quantization step QP used when the moving image encoder 2 quantizes the DCT coefficient ($QP=2^{pq/6}$).

Out of the prediction parameters PP included in the macroblock layer MB, a prediction parameter PP regarding an inter-prediction partition for which a predicted image is generated by inter-prediction includes a reference image index RI, an estimated motion vector index PMVI, and a motion vector residual MVD, as shown in (e) of FIG. 2.

The motion vector residual MVD is coded data generated by the moving image encoder 2 carrying out Processes 4 to 6 below. Process 4: select a locally decoded image having been encoded/decoded and derive a motion vector my for a corresponding partition by referring to the selected locally decoded image having been encoded/decoded (hereinafter also referred to as "reference image"). Process 5: select an estimation method and, using the selected estimation method, derive an estimate pmv of a motion vector my (hereinafter also referred to as "estimated motion vector") assigned to the corresponding partition. Process 6: subtract the estimated motion vector pmv derived in the Process 5 from the motion vector my derived in the Process 4 to obtain a motion vector residual MVD and encode the motion vector residual MVD.

The aforementioned reference image index RI designates the locally decoded image having been encoded/decoded (reference image) selected in the Process 4. The aforementioned estimated motion vector index PMVI designates the estimation method selected in the Process 5. Examples of the estimation method selectable in the Process 5 include (1) a method for regarding, as an estimated motion vector pmv, the median of a motion vector assigned to a partition adjacent to a corresponding partition in a locally decoded image in the process of encoding/decoding (this partition is hereinafter also referred to as "adjacent partition"), and (2) a method for regarding, as an estimated motion vector pmv, a motion vector assigned to a partition occupying the same position as a corresponding partition in a locally decoded image having been encoded/decoded (this partition is often referred to as "collocated partition").

As shown in (e) of FIG. 2, the prediction parameter PP regarding a partition for which unidirectional prediction is carried out includes one reference image index RI, one estimated motion vector index PMVI, and one motion vector residual MVD, whereas the prediction parameter PP regarding a partition for which bidirectional prediction (weighted prediction) is carried out includes two reference image indices RI1 and RI2, two estimated motion vector indices PMVI1 and PMVI2, and two motion vector residuals MVD1 and MVD2.

Out of the prediction parameters PP included in the macroblock layer MB, the prediction parameter PP regarding an intra-prediction partition for which a predicted image is generated by intra-prediction includes a prediction mode flag PMF and a prediction mode code PMC as shown in (f) of FIG. 2. The prediction mode flag PMF takes the value of 1 when the prediction mode of the corresponding partition is equal to the prediction mode estimated based on the adjacent partition, and takes the value of 0 when otherwise. The prediction mode code PMC is obtained by encoding prediction mode designating information for designating the prediction mode of the corresponding partition, and is omitted when the value of the prediction mode flag PMF is 1.

(Moving Image Decoder 1)

The following explains the moving image decoder 1 in accordance with the present embodiment with reference to FIGS. 1 to 6. The moving image decoder 1 is a decoder including the technique employed in H.264/MPEG-4 AVC and KTA software.

FIG. 1 is a block diagram showing a configuration of the moving image decoder 1. As shown in FIG. 1, the moving image decoder 1 includes a variable-length code decoding section 13, a motion vector reconstructing section 14, a buffer memory 15, an inter-predicted image generation section 16, an intra-predicted image generation section 17, a prediction method determining section 18, an inverse quantization/inverse transform section 19, and an adder 20. The moving image decoder 1 is a device for decoding coded data #1 to generate a moving image #2.

The variable-length code decoding section 13 decodes, from the coded data #1, prediction parameters PP with respect to individual partitions. That is, with respect to an inter-prediction partition, the variable-length code decoding section 13 decodes, from the coded data #1, a reference image index RI, an estimated motion vector index PMVI, and a motion vector residual MVD, and supplies them to the motion vector reconstructing section 14. On the other hand, with respect to an intra-prediction partition, the variable-length code decoding section 13 decodes prediction mode designating information from the coded data #1, and supplies it to the intra-predicted image generation section 17. Furthermore, the variable-length code decoding section 13 decodes a macroblock type MBT from the coded data, and supplies it to the prediction method determining section 18 (not shown). Furthermore, the variable-length code decoding section 13 decodes, from the coded data #1, quantization prediction residuals QD regarding individual blocks and a quantization parameter difference $\Delta qp$ regarding a macroblock including the blocks, and supplies the quantization prediction residuals QD and the quantization parameter difference $\Delta qp$ to the inverse quantization/inverse transform section 19.

The motion vector reconstructing section 14 reconstructs a motion vector my regarding each inter-prediction partition on the basis of a motion vector residual MVD regarding the partition and a reconstructed motion vector mv' regarding other partition. Specifically, (1) the motion vector reconstructing section 14 derives an estimated motion vector pmv from the reconstructed motion vector mv' according to an estimation method designated by the estimated motion vector index PMVI, and (2) adds the estimated motion vector pmv thus derived and the motion vector residual MVD to obtain the motion vector my. The reconstructed motion vector mv' regarding other partition can be read out from the buffer memory 15. The motion vector reconstructing section 14 supplies the reconstructed motion vector my, together with a corresponding reference image index RI, to the inter-predicted image generation section 16. With respect to an inter-prediction partition for which a bidirectional prediction (weighted prediction) is carried out, the motion vector reconstructing section 14 supplies two reconstructed motion vectors mv1 and mv2, together with corresponding reference image indices RI1 and RI2, to the inter-predicted image generation section 16.

The inter-predicted image generation section 16 generates a motion compensated image mc regarding each inter-prediction partition. Specifically, using the motion vector my supplied from the motion vector reconstructing section 14, the inter-predicted image generation section 16 generates a motion compensated image mc from a decoded image P' designated by the reference image index RI also supplied from the motion vector reconstructing section 14. Here, the decoded image P' is an image having been already decoded, and the inter-predicted image generation section 16 can read out, from the buffer memory 15, pixel values of individual pixels constituting the decoded image P'. The motion compensated image mc generated by the inter-predicted image generation section 16 is supplied as an inter-predicted image Pred_Inter to the prediction method determining section 18. With respect to the inter-prediction partition for which bidirectional prediction (weighted prediction) is carried out, the inter-predicted image generation section 16 (1) generates, using the motion vector mv1, a motion compensated image mc1 from a decoded image P1 designated by the reference image index RI1, (2) generates, using the motion vector mv2, a motion compensated image mc2 from a reference image P2 designated by the reference image index RI2, and (3) adds an offset value to the weighted average of the motion compensated image mc1 and the motion compensated image mc2 to generate an inter-predicted image Pred_Inter. In this process, the two motion compensated images mc1 and mc2 are multiplied by weighting factors w1 and w2, respectively. How to set the weighting factors w1 and w2 will be mentioned later with reference to other drawings.

The intra-predicted image generation section 17 generates a predicted image Pred_Intra regarding each intra-prediction partition. Specifically, using a prediction mode designated by prediction mode designating information supplied from the variable-length code decoding section 13, the intra-predicted image generation section 17 generates the predicted image Pred_Intra from the decoded image P. Here, the decoded image P is an image which is in the process of decoding and is not yet completely decoded. The intra-predicted image generation section 17 can read out, from the buffer memory 15, pixel values of pixels belonging to a block having been decoded out of pixels constituting the decoded image P. The intra-predicted image Pred_Intra generated by the intra-predicted image generation section 17 is supplied to the prediction method determining section 18.

The prediction method determining section 18 determines whether each partition is an inter-prediction partition for which inter-prediction is to be carried out or an intra-prediction partition for which intra-prediction is to be carried out, based on the macroblock type MBT. In the former case, the prediction method determining section 18 supplies, as a predicted image Pred, the inter-predicted image Pred_Inter generated by the inter-predicted image generation section 16 to the adder 20. In the latter case, the prediction method determining section 18 supplies, as a predicted image Pred, the intra-predicted image Pred_Intra generated by the intra-predicted image generation section 17 to the adder 20.

The inverse quantization/inverse transform section 19 (1) carries out inverse quantization with respect to the quantization prediction residual QD, (2) subjects a DCT coefficient obtained by the inverse quantization to inverse DCT (Discrete Cosine Transform), and (3) supplies a prediction residual D obtained by the inverse DCT to the adder 20. In the reverse quantization with respect to the quantization prediction residual QD, the inverse quantization/inverse transform section 19 derives a quantization step QP from the quantization parameter difference $\Delta qp$ supplied from the variable-length code decoding section 13. The quantization parameter qp can be derived by adding the quantization parameter difference $\Delta qp$ to a quantization parameter qp' regarding a macroblock having been subjected to inverse quantization/inverse DCT immediately before. The quantization step QP can be derived from the quantization step qp by $QP=2^{pq/6}$.

The adder 20 adds the predicted image Pred supplied from the prediction method determining section 18 and the prediction residual D supplied from the inverse quantization/inverse transform section 19 to generate the decoded image P. The decoded image P generated by the adder 20 is outputted to the outside, and at the same time stored in the buffer memory 15 in such a manner that the decoded image P is related to PQC designating information decoded from coded data by the variable-length code decoding section 13.

(Inter-Predicted Image Generation Section 16)

Next, an explanation is made as to a configuration of the inter-predicted image generation section 16 with reference to FIG. 3. FIG. 3 is a block diagram showing a configuration of the inter-predicted image generation section 16. As shown in FIG. 3, the inter-predicted image generation section 16 includes a reference value calculation section 16a, a weighting factor calculation section 16b, a motion compensation section 16c, and a predicted image generation section 16d. The inter-predicted image generation section 16 can carry out both unidirectional prediction and bidirectional prediction. An explanation is made below as to a configuration for carrying out bidirectional prediction (weighted prediction).

The reference value calculation section 16a reads out, from the buffer memory 15, POC designating information related to the decoded images P1 and P2 (hereinafter referred to as "reference images L0 and L1") designated by the reference image indices RI1 and RI2, and specifies display orders POC_L0 and POC_L1 of the reference images L0 and L1, respectively. Then, the reference value calculation section 16a calculates inter-frame distances td and tb based on the display orders POC_L0 and POC_L1 of the reference images L0 and L1 and a display order POC_cur of the decoded image P in the process of decoding, and supplies the inter-frame distances td and tb to the weighting factor calculation section 16b. The inter-frame distance td is an inter-frame distance between a frame including the reference image L0 and a frame including the reference image L1, and the inter-frame distance tb is an inter-frame distance between a frame including the reference image L0 and a frame including the decoded image P in the process of decoding. How to calculate the inter-frame distances td and tb will be specifically described later.

The weighting factor calculation section 16b calculates weighting factors w1 and w2 based on the inter-frame distances td and tb calculated by the reference value calculation section 16a, and supplies the weighting factors w1 and w2 to the predicted image generation section 16d. How to calculate the weighting factors w1 and w2 will be described later.

The motion compensation section 16c reads out, from the buffer memory 15, the reference image L0 (decoded image P1) and the reference image L1 (decoded image P2) designated by the reference image indices RI1 and RI2, respectively. Then, by motion compensation using the motion vectors mv1 and mv2, the motion compensation section 16c generates the motion compensated images mc1 and mc2 from the reference images L1 and L0, respectively, and supplies the motion compensated images mc1 and mc2 to the predicted image generation section 16d. How to generate the motion compensated images mc1 and mc2 will be mentioned later.

Using the weighting factors w1 and w2 calculated by the weighting factor calculation section 16b and the motion compensated images mc1 and mc2 generated by the motion compensation section 16c, the predicted image generation section 16d generates the inter-predicted image Pred_Inter and outputs it.

(Generation of Inter-Predicted Image Pred_Inter)

Figure 4:
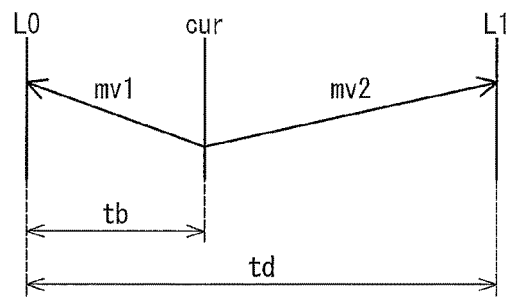
FIG. 4 is a view showing an example of a positional relation between each of reference frames and a prediction target frame.

Next, with reference to FIG. 4, an explanation is made as to a process for generating the inter-predicted image Pred_Inter by the inter-predicted image generation section 16.

Using the display order POC_L0 of the reference image L0 and the display order POC_cur of the decoded image P in the process of decoding, the reference value calculation section 16a calculates the inter-frame distance tb based on Formula (1) below.

$$tb = POC\_cur - POC\_L0 \quad (1)$$

Similarly, using the display order POC_L0 of the reference image L0 and the display order POC_L1 of the reference image L1, the reference value calculation section 16a calculates the inter-frame distance td based on Formula (2) below.

$$td = POC\_L1 - POC\_L0 \quad (2)$$

Besides, the inter-frame distances tb and td may be calculated based on formulae (3) and (4) below.

$$tb = abs(POC\_cur - POC\_L0) \quad (3)$$

$$td = abs(POC\_cur - POC\_L1) + abs(POC\_cur - POC\_L0) \quad (4)$$

Here, abs ( . . . ) indicates the absolute value of the parenthesized value. That is, the inter-frame distances tb and td represented by formulae (1) and (2) respectively can have negative values, whereas the inter-frame distances tb and td represented by formulae (3) and (4) respectively can have only positive values.

Here, the display order POC is used to calculate tb and td. A similar process can be made when using other information that allows for calculation/estimation of inter-frame distance (time difference), such as a display time and a display period. For example, assume that a display time is represented by T. In this case, by replacing POC_cur, POC_L0, and POC_L1 with T_cur (display time of the decoded image P in the process of decoding), T_L0 (display time of the reference image L0), and T_L1 (display time of the reference image L1), it is possible to calculate tb and td. In substitution for POC, similar information is usable also in subsequent configurations.

Using the inter-frame distances tb and td calculated by the reference value calculation section 16a, the weighting factor calculation section 16b calculates the weighting factors w1 and w2 to be used in weighted prediction. How to calculate the weighting factors w1 and w2 will be specifically explained in (Specific Example 1-1) to (Specific Example 1-5) below.

By motion compensation using the motion vector mv1, the motion compensation section 16c generates the motion compensated image mc1 from the reference image L0. Similarly, by motion compensation using the motion vector mv2, the motion compensation section 16c generates the motion compensated image mc2 from the reference image L1.

That is, each pixel value mc1 (x, y) of the motion compensated image mc1 and each pixel value mc2 (x, y) of the motion compensated image mc2 are generated based on formulae (5) and (6).

$$mc1(x,y) = L0(x+mv1x, y+mv1y) \quad (5)$$

$$mc2(x,y) = L1(x+mv2x, y+mv2y) \quad (6)$$

Here, (x, y) represents coordinates of a target pixel in the motion compensated images mc1 and mc2, (mv1x, mv1y) represents x-component and y-component of the motion vector mv1, and (mv2x, mv2y) represents x-component and y-component of the motion vector mv2. Furthermore, L0(x, y) represents a pixel value at the coordinates (x, y) of the reference image L0, and L1(x, y) represents a pixel value at the coordinates (x, y) of the reference image L1.

Assume that the weighting factor by which each pixel value of the motion compensated image mc1 is to be multiplied is a weighting factor w1 and the weighting factor by which each pixel value of the motion compensated image mc2 is to be multiplied is a weighting factor w2. At that time, the predicted image generation section 16d generates the pixel value pred(x, y) of each pixel of the inter-predicted image Pred_Inter based on Formula (7).

$$pred(x,y)=w1 \times mc1(x,y)+w2 \times mc2(x,y)+o \quad (7)$$

Here, o represents an offset value and (x, y) represents coordinates of a target pixel. The weighting factors w1 and w2 represent weighting factors that meet a relation w1+w2=1.

(Specific Examples of Process for Calculating Weighting Factor)

The following explains specific examples of a process for calculating weighting factors w1 and w2 by the weighting factor calculation section 16b.

The weighting factor calculation section 16b carries out one of processes described in (Specific Example 1-1) to (Specific Example 1-5) below, and calculates the weighting factors w1 and w2 by which pixel values of the motion compensated images are to be multiplied in Formula (7). In any of the Specific Examples, a ratio of w1 to w2 is closer to 1:1 than 1−tb/td: tb/td. That is, a relation 0<|w2−0.5|<|tb/td−0.5| is met.

Specific Example 1-1

The following explains a first example of a process for calculating the weighting factors w1 and w2 by the weighting factor calculation section 16b.

In the present example, when a ratio of the weighting factor w1 to w2 that are obtained by referring to the inter-frame distance is greatly away from 1:1, the weighting factor calculation section 16b sets the weighting factors w1 and w2 to predetermined values, and when otherwise, the weighting factor calculation section 16b sets the weighting factors w1 and w2 to the ratio of the inter-frame distances.

Using the inter-frame distances tb and td that are calculated by the reference value calculation section 16a in accordance with formulae (1) and (2) or (3) and (4), the weighting factor calculation section 16b calculates the weighting factors w1 and w2 in accordance with formulae (8) and (9).

$$w2=\text{clip3}(th1,th2,tb/td) \quad (8)$$

$$w1=1-w2 \quad (9)$$

Here, clip 3 (argument 1, argument 2, argument 3) indicates a function that becomes the argument 1 when the argument 3 is less than the argument 1 (argument 1>argument 3), becomes the argument 2 when the argument 3 is more than the argument 2 (argument 2<argument 3), and becomes the argument 3 when the argument 3 is not less than the argument 1 and not more than the argument 2 (argument 1≤argument 3≤argument 2). That is, clip 3 (argument 1, argument 2, argument 3) indicates a clipping process that limits the range of the value by using two different thresholds (arguments 1 and 2).

Therefore, when tb/td is less than th1, the weighting factor w2 is th1, when tb/td is more than th2, the weighting factor w2 is th2, and when tb/td is not less than th1 and not more than th2, the weighting factor w2 is tb/td.

th1 and th2 represent the lower threshold and the upper threshold in the clipping process, respectively. th1 and th2 are set so that the coding efficiency is maximized. In the present example, th1=0.33 and th2=0.67. However, th1 and th2 are not limited to them as long as a relation th1<0.5<th2 is met.

According to the finding by the inventor of the present invention, there is a pattern that when the ratio of the inter-frame distances tb/td is close to 0.5, i.e. when the ratio of the distance between the reference image L0 and the prediction target image (decoded image in the process of decoding) to the distance between the reference image L1 and the prediction target image is closer to 1:1, noises that may be generated in the predicted image are reduced. On the other hand, there is a pattern that when an object on a screen makes uniform motion for example, prediction accuracy increases by using the ratio of inter-frame distances as a weighting factor. However, there is a problem that even when the ratio of inter-frame distances is used as a weighting factor, the ratio being greatly away from 0.5 results in more amount of noises in the predicted image, reducing the coding efficiency.

With the operation of the present example, the weighting factor calculation section 16b can increase prediction accuracy by using the ratio of inter-frame distances as a weighting factor while preventing the increase in noises by carrying out the above clipping process when the ratio of inter-frame distances is greatly away from 0.5.

Therefore, the moving image encoder 2 having means similar to the weighting factor calculation section 16b that carries out the operation of the present example can generate coded data with higher coding efficiency than the case of using the ratio of inter-frame distances as a weighting factor and a clipping process is not carried out.

Furthermore, the moving image decoder 1 having the weighting factor calculation section 16b carrying out the operation of the present example can suitably decode coded data with a high coding efficiency thus generated.

The weighting factors may be expressed by integers. In this case, the weighting factors w1 and w2 can be calculated by multiplying formulae (8) and (9) by a predetermined integer. Furthermore, pixel values of the inter-predicted image can be generated by dividing Formula (7) by a predetermined integer.

That is, the weighting factors w1 and w2 can be calculated by formulae (8') and (9') below.

$$w2a=(64 \times tb+td/2)/td$$

$$w2=\text{clip3}(th1 \times 64, th2 \times 64, w2a) \quad (8')$$

$$w1=64-w2 \quad (9')$$

wherein w2a is a temporary variable used in calculating w2.

Formulae (8') and (9') are respectively obtained by multiplying formulae (8) and (9) by 64. However, the value by which formulae (8) and (9) are to be multiplied is not limited to 64 and may be changed according to bit depth.

In the present example, in order that th1=0.33 and th2=0.67, Formula (8') is expressed as w2=clip3 (21, 43, tb/td). In this case, when the value obtained by multiplying th1 and th2 by a predetermined integer is a decimal figure, numbers after the decimal point are round off to be expressed by an integer, so that the arguments 1 and 2 in the clipping process become integers.

Furthermore, an inter-predicted image generated by using the weighting factors w1 and w2 calculated by formulae (8') and (9') is generated by using Formula (7') below.

$$pred(x,y)=(w1 \times mc1(x,y)+w2 \times mc2(x,y)+o)/64 \quad (7')$$

Specific Example 1-2

The following explains a second example of a process for calculating the weighting factors w1 and w2 by the weighting factor calculation section 16b.

In the present example, initially, a process for approximating the ratio of inter-frame distances tb/td to 0.5 is carried out. Then, the weighting factor w2 is calculated using the value subjected to the process (the value obtained by referring to the ratio of inter-frame distances).

Specifically, using the inter-frame distances tb and td calculated by the reference value calculation section 16a, the weighting factor calculation section 16b calculates the weighting factor w2 based on formulae (10) and (11).

$$w2b=\{(tb/td-0.5) \times r+0.5\} \quad (10)$$

$$w2=\text{clip3}(th1,th2,w2b) \quad (11)$$

wherein w2b is a temporary variable used to calculate w2. As is obvious from Formula (10), the value of w2b is closer to 0.5 than the given value of tb/td is. r in Formula (10) is a constant that defines how closer the value of w2b is to 0.5 than the value of tb/td is. th1 and th2 are thresholds used in the clipping process as in Specific Example 1-1. Specific values of r, th1, and th2 are preset so that the coding efficiency is maximized. In the present example, r=3/4, th1=0.33, and th2=0.67. However, r, th1, and th2 are not limited to these values as long as relations 0<r<1 and th1<0.5<th2 are met.

Furthermore, using the weighting factor w2 obtained by formulae (10) and (11), the weighing factor calculation section 16b calculates the weighing factor w1 based on Formula (9).

As described above, the weighting factor calculation section 16b calculates w2 by carrying out the clipping process with respect to w2b which is closer to 0.5 than the given value of tb/td is.

Furthermore, with the operation of the present example, even when the value of tb/td is less than the threshold th1 or the value of tb/td is more than the threshold th2, the weighting factor calculation section 16b can calculate the weighting factor w2 which is not less than the threshold th1 and not more than the threshold th2. For example, assume that r=3/4, th1=0.33, and th2=0.67. In this case, when tb/td=0.3, the value of w2b calculated based on Formula (10) is 0.35, which is more than the threshold th1. Accordingly, w2 which is a value after the clipping process is 0.35, too.

The process for approximating the ratio of inter-frame distances tb/td to 0.5 may be carried out based on other formula instead of Formula (10). For example, a function of high degree such as a cubic function, a sigmoid function, a logistic function etc. may be used. Alternatively, the approximation may be made by referring to a table that gives a value closer to 0.5 from the ratio tb/td.

As described above, in the present example, with respect to the given tb/td, it is possible to calculate the weighting factor w2 which is closer to 0.5 than in Specific Example 1-1, so that it is possible to further reduce noises generated in the predicted image.

Furthermore, by approximating the ratio of inter-frame distances tb/td to 0.5 in advance, the variable w2b is more likely to be within the range of not less than the lower threshold for the clipping process and not more than the upper threshold. This allows for finding the weighting factor w2 which more effectively reflects the ratio of inter-frame distances, so that prediction error can be further reduced. Furthermore, since the above process approximates the weighting factor w2 to 0.5, the weighting factor w1 is also approximated to 0.5. That is, the ratio of the weighting factor w1 to the weighting factor w2 is closer to 1:1, so that it is possible to more effectively prevent the decrease in the coding efficiency due to noises.

Specific Example 1-3

The following description will discuss a third example of how the weighting factor calculation section 16b calculates weighting factors w1 and w2.

In the present example, weighting factors w1 and w2 are calculated with a lower threshold and an upper threshold for a clipping process that are set in accordance with a partition size. Here, the term "partition size" means a size of a prediction target partition (for which a predicted image is to be generated). Note that the weighting factor calculation section 16b can specify a partition size of the prediction target partition by referring to a macroblock type MBT which has been decoded by the variable-length code decoding section 13.

The weighting factor calculation section 16b calculates, based on Formula (12), the weighting factor w2 with the use of an inter-frame distance tb and an inter-frame distance td calculated by the reference value calculation section 16a.

$$w2=\text{clip3}(th1',th2',tb/td) \quad (12)$$

wherein th1' and th2' are the lower and upper thresholds, respectively, for the clipping process which vary depending on the partition size. For example: in a case where the partition size is 16×16 or larger, (th1', th2') is set to (0.30, 0.70); in a case where the partition size is 16×8 or 8×16, (th1', th2') is set to (0.35, 0.65); in a case where the partition size is 8×8, (th1', th2') is set to (0.40, 0.60); in a case where the partition size is 8×4 or 4×8, (th1', th2') is set to (0.45, 0.55); and in a case where the partition size is 4×4, (th1', th2') is set to (0.50, 0.50).

This shows that a difference between the upper threshold and the lower threshold for the clipping process is positively correlated with the partition size.

Moreover, the weighting factor calculation section 16b calculates, based on Formula (9), a weighting factor w1 with the used of the calculated weighting factor w2.

According to the inventor's findings, there is a pattern that in a case where the partition size varies, an optimal weighting factor varies. Note that the optimal weighting factor is a weighting factor which the moving image decoder 1 derives with a least-squares method so that a square error between an original image and a decoded image is minimized.

Specifically, there is a pattern that in a case where the partition size is large, a prediction error that can be caused in the predicted image is reduced by approximating a ratio of the weighting factor w1 to the weighting factor w2 to a ratio of the inter-frame distances. On the other hand, there is a pattern that in a case where the partition size is small, a noise that can be caused in the predicted image is reduced by approximating the ratio of the weighting factors w1 to w2 to a ratio 1:1.

In a case where the partition size is large, the prediction error that can be caused in the predicted image is further reduced because the ratio between the weighting factors w1 and w2 is approximated to the ratio between the inter-frame distances by using the weighting factors w1 and w2 generated in the present example. On the other hand, in a case where the partition size is small, a noise can be reduced because the ratio between the weighting factors w1 and w2 is approximated to the ratio 1:1 by using the weighting factors w1 and w2 generated in the present example. With the configuration, it is possible to generate a predicted image with a reduced error. This allows an improvement in coding efficiency.

Note that the lower threshold th1' and the upper threshold th2' for the clipping process which vary depending on the partition size are not limited to those described in the present example, and may be set to respective optimal values for generating a further accurate predicted image. In a case where the partition size is large, a method may be employed in which clipping is not carried out.

Specific Example 1-4

The following description will discuss a fourth example of how the weighting factor calculation section 16b calculates weighting factors w1 and w2.

In the present example, rational coefficients are used as weighting factors w1 and w2 that vary depending on a partition size. Note that the rational coefficients have identical denominators for approximating the optimal weighting factors.

Figure 5:
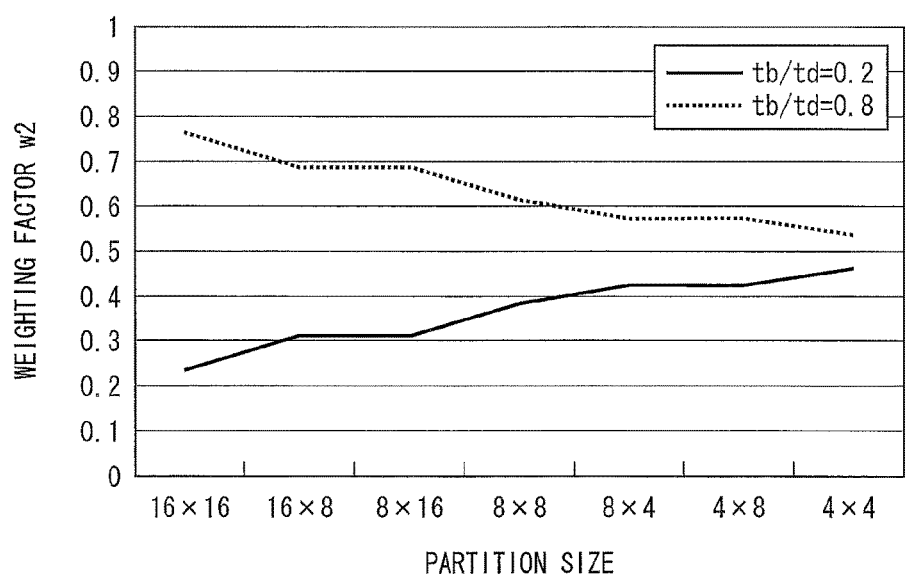
FIG. 5 is a graph showing weighting factors with respect to each partition size in cases where ratios of inter-frame distances are 0.2 and 0.8.

The weighting factor calculation section 16b calculates, based on Formula (13), the weighting factor w2 with the use of the inter-frame distance tb and the inter-frame distance td calculated by the reference value calculation section 16a. Note that, in a case where r1=r2, Formula (13) can be changed into "(tb/td−0.5)×r1+0.5", which is the same form as Formula (10).

$$w2=(tb/td) \times r1+0.5 \times r2 \qquad (13)$$

wherein r1 and r2 are respective rational coefficients having identical denominators for approximating an optimal weighting factor. FIG. 5 illustrates optimal weighting factors determined for each partition size by a least-squares method. The coefficients r1 and r2 which vary depending on the partition sizes can be set, for example, as follows (see a graph of FIG. 5).

That is: in a case where the partition size is 16×16 or larger, (r1, r2) is set to (14/16, 2/16); in a case where the partition size is 16×8 or 8×16, (r1, r2) is set to (10/16, 6/16); in a case where the partition size is 8×8, (r1, r2) is set to (6/16, 10/16); in a case where the partition size is 8×4 or 4×8, (r1, r2) is set to (4/16, 12/16); and, in a case where the partition size is 4×4, (r1, r2) is set to (2/16, 14/16).

In the present example, the identical denominators are set to 16. Note, however, that it is of course possible to employ any other natural number as the identical denominators.

Specific Example 1-5

The following description will discuss a fifth example of how the weighting factor calculation section 16b calculates weighting factors w1 and w2.

In the present example, an error is modeled so that an optimal weighting factor is obtained. Here, a pixel value of a decoded image is referred to as "orig", and the pixel value orig is assumed to be equal to "s". Moreover, a pixel value pred of a predicted image is expressed as follows: pred=w1× mc1+(1−w1)×mc2, wherein mc1 and mc2 are pixel values of a motion compensated image.

Based on an assumption that an error is caused due to a noise, the pixel values mc1 and mc2 are respectively expressed as follows: mc1=s+n1 and mc2=s+n2, wherein n1 and n2 are errors caused by a noise.

With the use of the terms, optimal weighting factors for minimizing an error E are calculated based on the following formulae. Here, the errors are assumed to be temporally independent, i.e., it is assumed that n1×n2=0.

[Mathematical Formula 1]

$$\begin{aligned}
E &= |orig - pred|^2 \\
&= |s - w1 \times mc1 - (1-w1) \times mc2|^2 \\
&= |s - (w1 + 1 - w1) \times s + w1 \times n1 + (1-w1) \times n2|^2 \\
&= |w1 \times n1 + (1-w1) \times n2|^2 \\
&= w1^2 \times n1^2 + (1-w1)^2 \times n2^2 + 2 \times w1 \times n1 \times (1-w1) \times n2
\end{aligned}$$

here, if $n1^2 = N1, n2^2 = N2, n1 \times n2 = 0$, $$= N1 \times w1^2 + N2 \times (1-w1)^2$$
$$= (N1 + N2) \times w1^2 - 2 \times N2 \times w1 + N2$$

Here, the error E is differentiated with respect to w1.

[Mathematical Formula 2]

$$\frac{dE}{dw1} = 2 \times (N1 + N2) \times w1 - 2 \times N2$$

The weighting factor w1 for minimizing the error E is expressed by the following Formula (14) by solving the above formula by setting that (dE/dw1)=0.

[Mathematical Formula 3]

$$w1 = \frac{N2}{(N1+N2)} \qquad (14)$$

Formula (14) shows that, in a case where an error is caused by a noise and the error is temporally independent, the weighting factor w1 becomes smaller as an error N1 caused in the pixel value mc1 becomes larger. Here, assume that an error caused in the pixel value mc1 is identical with an error caused in the pixel value mc2, that is, N1=N2, the weighting factor w1 becomes 0.5. Moreover, the weighting factor w2 becomes 0.5 based on Formula (9). That is, a ratio between the weighting factors w1 and w2 becomes 1:1.

From this, in a case where an error is caused by a noise and the error is temporally independent, the weighting factors w1 and w2 having the ratio 1:1 are the optimal weighting factors.

Figure 6:
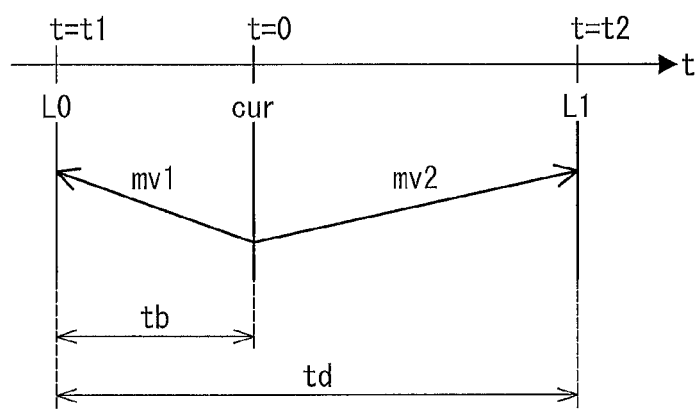
FIG. 6 is a view showing an example of a relation between (i) a positional relation between each of reference frames and a prediction target frame and (ii) time t.

On the other hand, in a case where an error is caused by a constant time variation, the pixel value pred of the predicted image is expressed as follows:

$$pred=w1 \times mc1+(1-w1) \times mc2$$

wherein mc1 and mc2 are respective pixel values of a motion compensated image. Errors n1 and n2 caused by the time variation are respectively expressed as follows: n1=nc× t1 and n2=nc×t2, wherein nc is an error caused in a certain time, and t1 and t2 are time differences from a prediction target image (i.e., a decoded image in the process of decoding). FIG. 6 illustrates an example of a relation between (i) a positional relation between each of reference frames and a prediction target frame and (ii) time t. In a case where the prediction target image is set to be a start point (i.e., t=0), t1 represents time prior to the prediction target image (i.e., t1<0), and t2 represents time after the prediction target image (i.e., t2>0) (see FIG. 6).

With the use of the terms, optimal weighting factors for minimizing the error E are calculated based on the following formulae.

[Mathematical Formula 4]

$$E = |orig - pred|^2$$
$$= |s - w1 \times mc1 - (1 - w1) \times mc2|^2$$
$$= |s - (w1 + 1 - w1) \times s + w1 \times n1 + (1 - w1) \times n2|^2$$
$$= |w1 \times n1 + (1 - w1) \times n2|^2$$

here, if $n1 = nc \times t1, n2 = nc \times t2, nc^2 = NC$, $$= |w1 \times nc \times t1 + (1 - w1) \times nc \cdot t2|^2$$
$$= NC|w1 \times t1 + (1 - w1) \times t2|^2$$
$$= NC|w1 \times (t1 - t2) + t2|^2$$

Here, the error E is differentiated with respect to w1.

[Mathematical Formula 5]

$$\frac{dE}{dw1} = 2 \times NC(w1 \times (t1 - t2) + t2) \times (t1 - t2)$$

The weighting factor w1 for minimizing the error E is expressed by the following Formula (15) by solving the above formula by setting that (dE/dw1)=0.

[Mathematical Formula 6]

$$w1 = \frac{-t2}{t1 + t2} \quad (15)$$

The weighting factor w2 can be expressed by Formula (16) which is obtained by substituting Formula (15) for Formula (9).

[Mathematical Formula 7]

$$w2 = \frac{t1}{t1 + t2} \quad (16)$$

Moreover, the weighting factor w2 can be expressed as follows: w2=tb/td, because t1−t2=td, and t1=tb (see FIG. 6). From this, in a case where an error is caused by a constant time variation, the weighting factors w1 and w2 are expressed by a ratio of inter-frame distances, and such weighting factors are the optimal weighting factors.

Weighting factors used in implicit_mode of H.264/MPEG-4 AVC are expressed by a ratio of inter-frame distances from reference frames to a prediction frame, with respect to an image displayed in uniform motion.

That is, optimal weighting factors w1 and w2, which are obtained by using Formulae (15) and (16) in a case where an error is caused by a constant time variation, are similar to weighting factors w1 and w2 obtained in implicit_mode of H.264/MPEG-4 AVC.

The following description will discuss how optimal weighting factors are estimated in a case where an error is made up of (i) a component independent from a time variation and (ii) a component subjected to a constant time variation.

First, assume that orig=s, and pred=w1×mc1+(1−w1)×mc2, pixel values mc1 and mc2 of a motion compensated image are respectively expressed as mc1=s+n1, and mc2=s+n2, wherein each of n1 and n2 are errors caused by a noise and a time variation. The errors n1 and n2 are expressed as n1=nc×t1+nd1, and n2=nc×t2+nd2, respectively, wherein nc is an error caused in a certain time, t1 and t2 are time differences from a prediction target image, and nd1 and nd2 are errors caused by a noise.

With the use of the terms, optimal weighting factors for minimizing the error E are calculated based on the following formulae.

[Mathematical Formula 8]

$$E = |orig - pred|^2$$
$$= |s - w1 \times mc1 - (1 - w1) \times mc2|^2$$
$$= |s - (w1 + 1 - w1) \times s + w1 \times n1 + (1 - w1) \times n2|^2$$
$$= |w1 \times n1 + (1 - w1) \times n2|^2$$

here, if $n1 = nc \times t1 + nd1, n2 = nc \times t2 + nd2$,
$$= |w1 \times (nc \times t1 + nd1) + (1 - w1) \times (nc \times t2 + nd2)|^2$$
here, if $nc^2 = NC, nd1^2 = ND1$,
$nd2^2 = ND2, nc \times (1 - w1) \times nd1 = 0$,
$$= w1^2(NC \times t1^2 + ND1) + (1 - w1)^2 \times (NC \times t2^2 + ND2) +$$
$$2w1 \times (1 - w1) \times NC \times t1 \times t2$$

Here, the error E is differentiated with respect to w1.

[Mathematical Formula 9]

$$\frac{dE}{dw1} = NC \left\{ 2w1 \left( t1^2 + \frac{ND1}{NC} \right) - \right.$$
$$\left. 2(1 - w1) \times \left( t2^2 + \frac{ND2}{NC} \right) + (2 - 4w1) \times t1 \times t2 \right\} \approx$$
$$w1(t1^2 + k1) - (1 - w1) \times (t2^2 + k2) + (1 - 2w1) \times t1 \times t2 =$$
$$(t1^2 + k1 + t2^2 + k2 - 2t1 \times t2)w1 - (t2^2 + k2 - t1 \times t2)$$

The terms k1 and k2 are obtained by k1=ND1/NC and k2=ND2/NC, respectively.

The weighting factor w1 for minimizing the error E is expressed by the following Formula (17) by solving the above formula by setting that (dE/dw1)=0.

[Mathematical Formula 10]

$$w1 = \frac{(t1 - t2) \times (-t2) + k2}{(t1 - t2)^2 + k1 + k2} \quad (17)$$

The weighting factor w2 can be expressed by Formula (18) which is obtained by substituting Formula (17) for Formula (9).

[Mathematical Formula 11]

$$w1 = \frac{t1 \times (t1 - t2) + k1}{(t1 - t2)^2 + k1 + k2} \quad (18)$$

In a case where no error is caused by a noise (i.e., k1=k2=0), weighting factors w1 and w2 obtained based on Formulae (17) and (18) are similar to weighting factors w1 and w2 obtained in implicit_mode of H.264/MPEG-4 AVC. On the other hand, in a case where there is no time variation (i.e., t1=t2=0), a ratio of weighting factors w1 and w2 becomes equal to a ratio of errors caused by a noise.

As such, by using the weighting factors w1 and w2 calculated based on Formulae (17) and (18), it is possible to (i) reduce an error caused by a noise and (ii) generate a predicted image with a reduced error.

A weighting factor calculated by utilizing the above modeling is closer to 0.5 than a weighting factor w2 (=tb/td) is, which is obtained in an Implicit mode.

Moreover, by using the above method, coded data can be generated with good coding efficiency. Further, it is possible to generate a decoded image with a reduced error with respect to the coded data thus generated.

In a case where an error has a component subjected to a non-constant time variation, optimal weighting factors are estimated as follows.

First, assume that orig=s, and pred=w1×mc1+(1−w1)×mc2, pixel values mc1 and mc2 of a motion compensated image are expressed as mc1=s+n1 and mc2=s+n2, respectively, wherein each of n1 and n2 are errors caused by a noise and a time variation. The errors n1 and n2 are expressed as n1=nc1×t1 and n2=nc2×t2, respectively, wherein nc1 and nc2 are components independent from time, and t1 and t2 are time differences from a prediction target image.

In this case, the error E is expressed as follows:

$$E = |orig - pred|^2$$
$$= |w1 \times n1 + (1-w1) \times n2|^2$$

Here, by substituting (i) nc1×t1 for n1 and (ii) nc2×t2 for n2, the following formula is obtained:

$$E = |w1 \times nc1 \times t1 + (1-w1) \times nc2 \times t2|^2$$
$$= w1^2 \times NC1 \times t1^2 + (1-w1)^2 \times NC2 \times t2^2$$

Here, $NC1 = nc1^2$ and $NC2 = nc2^2$.

The following formula is obtained by differentiating the error E with respect to w1:

$$\frac{dE}{dw1} = 2 \times w1 \times NC1 \times t1^2 - 2 \times (1-w1) \times NC2 \times t2^2$$
$$= 2 \times (NC1 \times t1^2 + NC2 \times t2^2) \times w1 - 2 \times NC2 \times t2^2$$

The weighting factor w1 for minimizing the error E is expressed by the following Formula (17') by solving the above formula by setting that (dE/dw1)=0.

$$w1 = (NC2 \times t2^2)/(NC1 \times t1^2 + NC2 \times t2^2) \tag{17'}$$

The weighting factor w2 is expressed as in the following Formula (18') with the use of Formula (9):

$$w2 = (NC1 \times t1^2)/(NC1 \times t1^2 + NC2 \times t2^2) \tag{18'}$$

In a case where nc1 and nc2 are substantially identical to each other, that is, NC1 and NC2 are substantially identical to each other, the weighting factors w1 and w2 are expressed by the following Formulae (17") and (18"), respectively:

$$w1 = t2^2/(t1^2 + t2^2) \tag{17''}$$

$$w2 = t1^2/(t1^2 + t2^2) \tag{18''}$$

The weighting factor calculation section 16b may be configured to calculate the weighting factors w1 and w2 based on Formulae (17'), (18'), (17"), and (18") as above described.

Note that the moving image decoder 1 may (i) carry out a weighted prediction according to a predetermined single method or (ii) (a) carry out a weighted prediction according to a method selected from a predetermined plurality of methods and (b) explicitly encode the selected method. In the latter case, any of the above described weighting methods can be used as one of selectable weighting methods. It is possible to employ a configuration in which, for example, (i) a weighting method is selected from the above described weighting methods and an Explicit mode defined by H.264/MPEG-4 AVC or (ii) a mode for carrying out a process to approximate a weighting factor to 0.5 as above described or another mode in which such a process is not carried out is selected.

(Moving Image Encoder 2)

Figure 7:
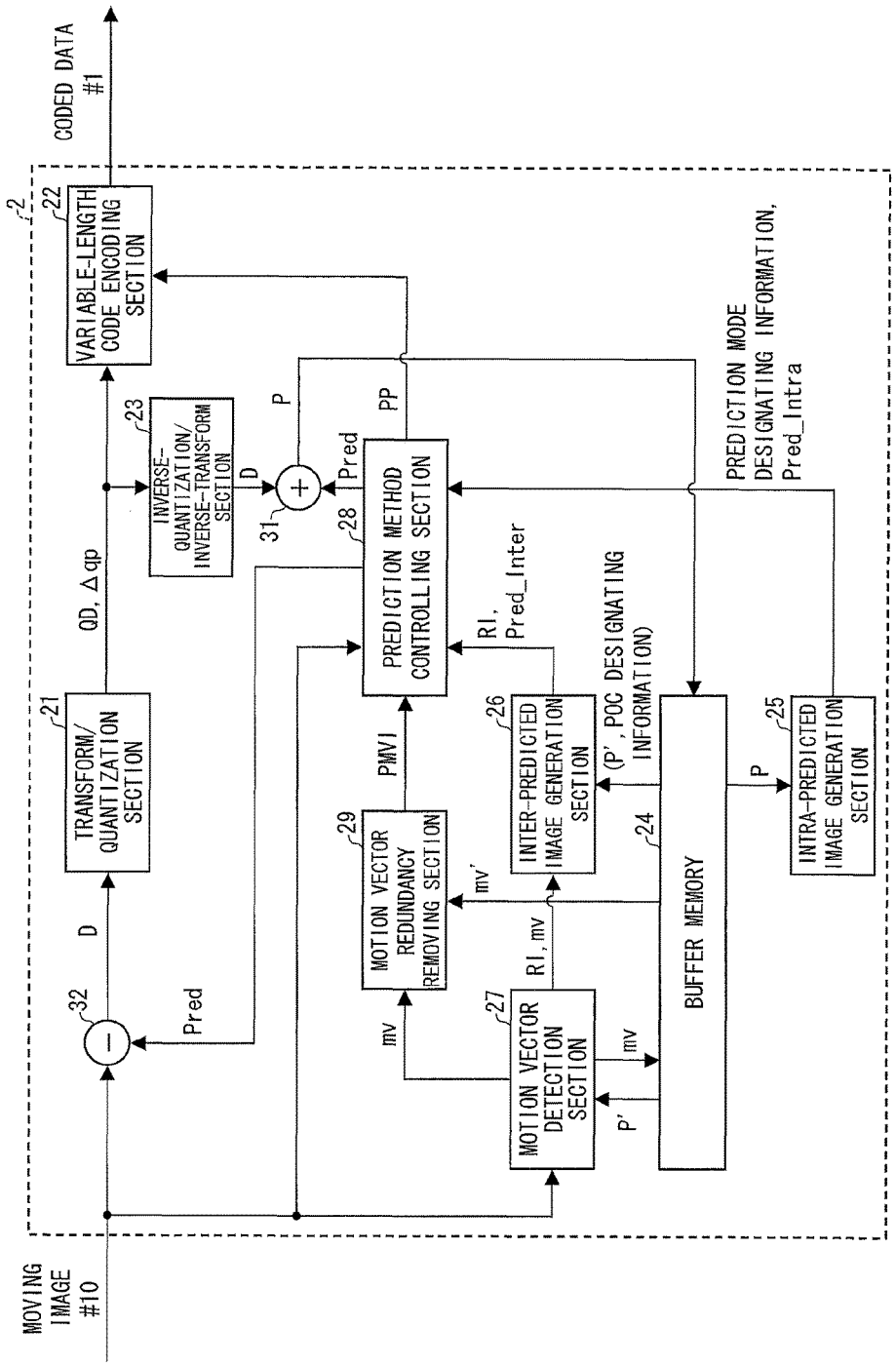
FIG. 7 is a block diagram showing a configuration of a moving image encoder in accordance with First Embodiment.
Figure 8:
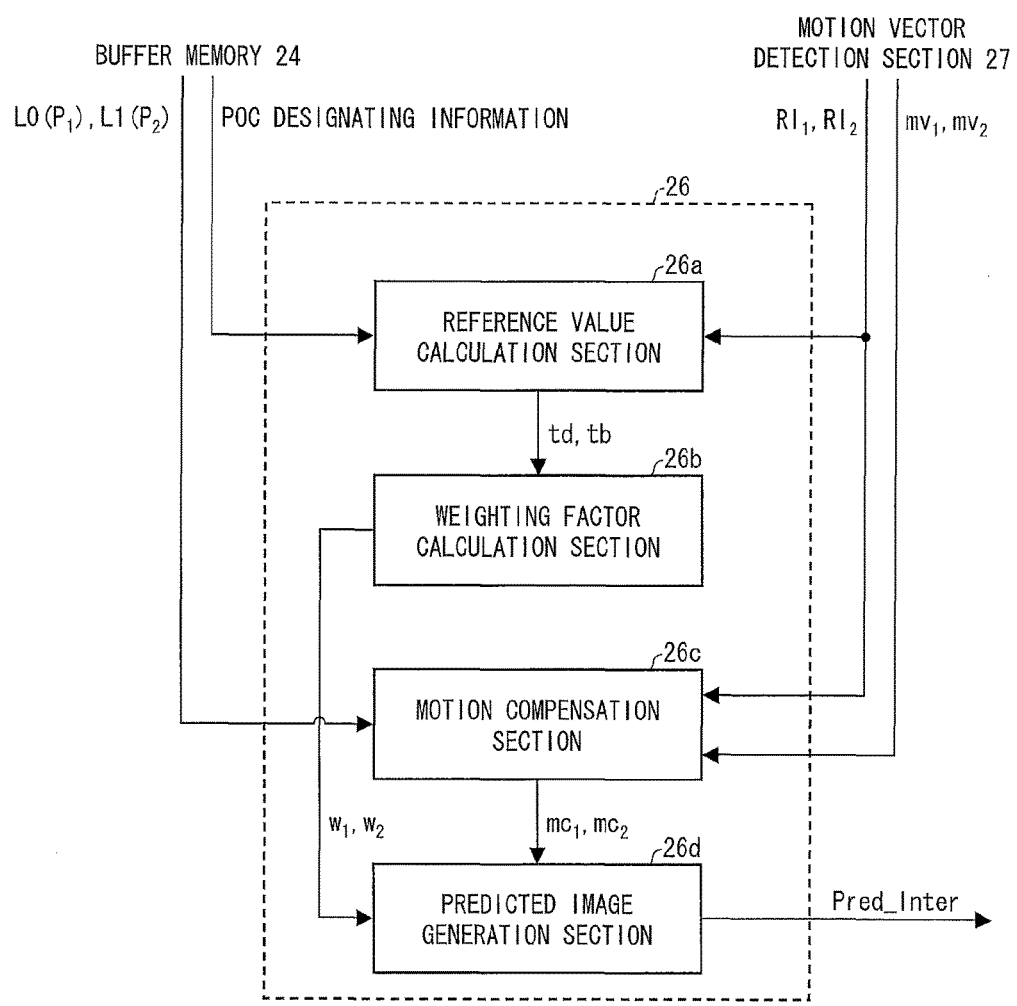
FIG. 8 is a block diagram showing a configuration of an inter-predicted image generation section of the moving image encoder shown in FIG. 7.

The following description will discuss, with reference to FIGS. 7 through 9, a configuration of the moving image encoder 2 in accordance with the present embodiment. The moving image encoder 2 is a decoder which includes H.264/MPEG-4 AVC and a technique adopted in KTA software.

FIG. 7 is a block diagram showing the configuration of the moving image encoder 2. As shown in FIG. 7, the moving image encoder 2 includes a transform/quantization section 21, a variable-length code encoding section 22, an inverse quantization/inverse transform section 23, a buffer memory 24, an intra-predicted image generation section 25, an inter-predicted image generation section 26, a motion vector detection section 27, a prediction method controlling section 28, a motion vector redundancy removing section 29, an adder 31, and a subtractor 32. The moving image encoder 2 is a device for encoding a moving image #10 to generate coded data #1.

The transform/quantization section 21 (1) carries out DCT (Discrete Cosine Transform) with respect to a prediction residual D per block which has been obtained by subtracting a predicted image Pred from an encoding target image so as to obtain a DCT coefficient, (2) quantizes the DCT coefficient so as to obtain a quantization prediction residual QD, and (3) supplies the quantization prediction residual QD to the variable-length code encoding section 22 and the inverse quantization/inverse transform section 23. Further, the transform/quantization section 21 (1) selects, for each macroblock, a quantization step QP for use in such quantization of the DCT coefficient, (2) supplies, to the variable-length code encoding section 22, a quantization parameter difference Δqp indicative of a size of the quantization step QP thus selected, and (3) supplies the quantization step QP thus selected to the inverse quantization/inverse transform section 23. The "quantization parameter difference Δqp" indicates a difference value which is obtained by subtracting, from a value of a quantization parameter qp ($QP=2^{pq/6}$) related to a macroblock which is to be subjected to DCT/quantization, a value of a quantization parameter qp' related to a previous macroblock which has been subjected to DCT/quantization immediately before the DCT/quantization of that macroblock.

The variable-length code encoding section 22 carries out variable length encoding with respect to (A) the quantization prediction residual QD and the quantization parameter difference Δqp which are supplied from the transform/quantization section 21 and (B) a quantization parameter PP supplied from the prediction method controlling section 28 (later described). In this way, coded data is generated.

The inverse quantization/inverse transform section (1) inversely quantizes the quantization prediction residual QD to obtain a DCT coefficient, (2) carries out inverse DCT (Discrete Cosine Transform) with respect to the DCT coefficient thus obtained so as to obtain a prediction residual D, and (3) supplies, to the adder 31, the prediction residual D thus obtained. When inversely quantizing the quantization prediction residual QD, the quantization step QP supplied from the transform/quantization section 21 is used. Note that the prediction residual D supplied from the inverse quantization/inverse transform section 23 is obtained by adding a quantization error to the prediction residual D supplied to the transform/quantization section 21, however, the common "prediction residual D" is used for the sake of easy explanation.

The intra-predicted image generation section 25 generates predicted images Pred_Intra related to respective partitions. Specifically, the intra-predicted image generation section 25 (1) selects a prediction mode to be used for intra-prediction and (2) generates a predicted image Pred_Intra, with use of the prediction mode thus selected, on the basis of a locally decoded image P. The decoded image P is a locally decoded image which has not been fully decoded yet, i.e., which is in the process of decoding. The intra-predicted image generation section 25 can read out, from the buffer memory 24, pixel values of pixels that belong to a block which has been already decoded. The intra-predicted image generation section 25 supplies, to the prediction method controlling section 28, the intra-predicted image Pred_Intra thus generated and prediction mode designating information designating the prediction mode thus selected.

The motion vector detection section 27 detects a motion vector mv related to each of the partitions. Specifically, the motion vector detection section 27 detects a motion vector mv related to a target partition by (1) selecting a decoded image P' to be used as a reference image, (2) searching a region which produces the best approximation to a target partition in the decoded image P' thus selected. The "decoded image P'" is an image which has been already decoded, and the motion vector detection section 27 can read out, from the buffer memory 24, pixel values of pixels constituting the decoded image P'. The motion vector detection section 27 supplies, to the inter-predicted image generation section 26 and to the motion vector redundancy removing section 29, (A) the motion vector mv thus detected and (B) a reference image index RI that designates the decoded image P' which has been used as the reference image. Note that, with respect to a partition for which bidirectional prediction (weighted prediction) is to be carried out, two decoded images P1 and P2 are selected as reference images, and motion vectors mv1 and mv2 corresponding to the two decoded images P1 and P2 respectively and reference image indices RI1 and RI2 corresponding to the two decoded images P1 and P2 respectively are supplied to both of the inter-predicted image generation section 26 and the motion vector redundancy removing section 29.

The inter-predicted image generation section 26 generates motion compensated images mc regarding the respective inter-prediction partitions. Specifically, using the motion vector mv supplied from the motion vector detection section 27, the inter-predicted image generation section 26 generates the motion compensated image mc from the decoded image P' that is designated by the reference image index RI supplied from the motion vector detection section 27. Like the motion vector detection section 27, the inter-predicted image generation section 26 can read out, from the buffer memory 24, pixel values of respective pixels constituting the decoded image P'. The inter-predicted image generation section 26 supplies, to the prediction method controlling section 28, (A) the motion compensated image mc (intra-predicted image Pred_Intra) thus generated and (B) the reference image index RI supplied from the motion vector detection section 27. Note that, with respect to bidirectional prediction (weighted prediction) partition, the inter-predicted image generation section 26 generates an inter-predicted image Pred_Inter by (1) generating a motion compensated image mc1, with use of the motion vector mv1, from a decoded image P1 designated by the reference image index RI1, (2) generating a motion compensated image mc2, with use of the motion vector mv2, from the reference image P2 designated by the reference image index RI2, and (3) adding an offset value to a weighted average of the motion compensated image mc1 and the motion compensated image mc2.

The prediction method controlling section 28 selects whether to carry out intra-prediction or inter-prediction by comparing the intra-predicted image Pred_Intra and the inter-predicted image Pred_Inter with the encoding target image. In a case where the prediction method controlling section 28 selects the intra-prediction, the prediction method controlling section 28 supplies the intra-predicted image Pred_Intra serving as a predicted image Pred to the adder 31 and the subtractor 32, and supplies, to the variable-length code encoding section 22, prediction mode designating information which has been supplied from the intra-predicted image generation section 25 and which serves as a prediction parameter PP. On the other hand, in a case where the prediction method controlling section 28 selects the inter-prediction, the prediction method controlling section 28 supplies the inter-predicted image Pred_Inter serving as the predicted image Pred to the adder 31 and the subtractor 32, and supplies, to the variable-length code encoding section, (i) a reference image index RI supplied from the inter-predicted image generation section 26 and (ii) an estimated motion vector index PMVI and a motion vector residual MVD which are supplied from the motion vector redundancy removing section 29 (later described), which (i) and (ii) serve as the prediction parameter PP.

The subtractor 32 subtracts, from the encoding target image, the predicted image Pred selected by the prediction method controlling section 28, thereby generating a prediction residual D. The prediction residual D generated by the subtractor 32 is subjected to DCT/quantization by the transform/quantization section 21 as described above. On the other hand, the adder 31 adds the predicted image Pred selected by the prediction method controlling section 28 to the prediction residual D generated by the inverse quantization/inverse transform section 23, thereby generating a locally decoded image P. The locally decoded image P generated by the adder 31 is stored in the buffer memory 24, and is used as a reference image for the inter-prediction.

The motion vector redundancy removing section 29 removes redundancy of the motion vector mv detected by the motion vector detection section 27. Specifically, the motion vector redundancy removing section 29 generates a motion vector residual MVD by (1) selecting a method for estimating the motion vector mv, (2) deriving an estimated motion vector pmv in accordance with the method thus selected, and (3) subtracting the estimated motion vector pmv from the motion vector mv. The motion vector redundancy removing section 29 supplies, to the prediction method controlling section 28, the motion vector residual MVD thus generated and an estimated motion vector index PMVI indicative of the method thus selected.

(Inter-Predicted Image Generation Section 26)

FIG. 8 is a block diagram showing a configuration of the inter-predicted image generation section 26. As shown in FIG. 8, the inter-predicted image generation section 26 includes a reference value calculation section 26*a*, a weighting factor calculation section 26*b*, a motion compensation section 26*c*, and a predicted image generation section 26*d*.

The reference value calculation section 26*a*, the weighting factor calculation section 26*b*, the motion compensation section 26*c*, and the predicted image generation section 26*d* which are included in the inter-predicted image generation section 26 of the moving image encoder 2 have functions equivalent to those of the reference value calculation section 16*a*, the weighting factor calculation section 16*b*, the motion compensation section 16*c*, and the predicted image generation section 16*d*, respectively, included in the inter-predicted image generation section 16 of the moving image decoder 1.

Note that, in the moving image decoder 1, reference image indices RI and R2 and motion vectors mv1 and mv2 are supplied from the motion vector decoding section 14, whereas in the moving image encoder 2, these are supplied from the motion vector detection section 27. Further, in the moving image decoder 1, the POC designating information and the reference images L0 and L1 are read out from the buffer memory 25, whereas in the moving image encoder 2, these are read out from the buffer memory 24.

(Specific Examples of Process for Calculating Weighting Factor)

The following description will discuss specific examples where the weighting factor calculation section 26*b* carries out a process for calculating weighting factors w1 and w2. The weighting factor calculation section 26*b* carries out one of the following calculation processes ((Specific Example 1-1') to (Specific Example 1-5')).

Specific Example 1-1'

The following description will discuss a first example where the weighting factor calculation section 26*b* carries out a process for calculating weighting factors w1 and w2. In this example, the weighting factor calculation section 26*b* calculates the weighting factors w1 and w2 with use of Formulae (8) and (9), as in the (Specific Example 1-1) where the weighting factor calculation section 16*b* of the moving image decoder 1 carries out a process for calculating weighting factors w1 and w2.

FIG. 9 shows coding amount reduction ratios in sequences of the coded data #1 generated by encoding with use of the inter-predicted image Pred_Inter generated with use of the weighting factors w1 and w2 calculated as above.

FIG. 9 is a graph showing (A) coding amount reduction ratios in sequences of coded data #1 generated with use of the weighting factor in this example and (B) coding amount reduction ratios in sequences of coded data generated with use of an implicit_mode of the H.264/MPEG-4 AVC.

It is found from FIG. 9 that a coding amount of the coded data #1 generated with use of the weighting factor in this example is reduced in almost all the sequences.

This indicates that the moving image encoder 2 in which this example is employed can reduce the coding amount of the coded data #1.

Specific Example 1-2'

The following description will discuss a second example where the weighting factor calculation section 26*b* carries out a process for calculating weighting factors w1 and w2. In this example, the weighting factor calculation section 26*b* calculates the weighting factors w1 and w2 with use of Formulae (10), (11), and (9), as in the (Specific Example 1-2) where the weighting factor calculation section 16*b* of the moving image decoder 1 carries out the process for calculating the weighting factors w1 and w2.

In the inter-predicted image Pred_Inter generated with use of the weighting factors w1 and w2 calculated as above, an error caused by noise is reduced. The moving image encoder 2 can therefore generate coded data #1 having a smaller coding amount.

Specific Example 1-3'

The following description will discuss a third example where the weighting factor calculation section 26*b* carries out a process for calculating weighting factors w1 and w2. In this example, the weighting factor calculation section 26*b* calculates the weighting factors w1 and w2 with use of Formulae (12) and (9), as in the (Specific Example 1-3) where the weighting factor calculation section 16*b* of the moving image decoder 1 carries out the process for calculating the weighting factors w1 and w2.

In a case where the inter-predicted image Pred_Inter generated with use of the weighting factors w1 and w2 calculated as above has a large partition-size, prediction error is reduced. On the other hand, in a case where the inter-predicted image Pred_Inter has a small partition-size, error caused by noise is reduced.

By using the weighting factors w1 and w2 calculated with use of this example, the moving image encoder 2 can generate coded data #1 having a smaller coding amount.

Specific Example 1-4'

The following description will discuss a fourth example where the weighting factor calculation section 26*b* carries out a process for calculating weighting factors w1 and w2. In this example, the weighting factor calculation section 26*b* calculates the weighting factors w1 and w2 with use of Formulae (13) and (9), as in the (Specific Example 1-4) where the weighting factor calculation section 16*b* of the moving image decoder 1 carries out the process for calculating the weighting factors w1 and w2.

In a case where the inter-predicted image Pred_Inter generated with use of the weighting factors w1 and w2 calculated as above has a large partition-size, prediction error is reduced. On the other hand, in a case where the inter-predicted image Pred_Inter has a small partition-size, error caused by noise is reduced.

By using the weighting factors w1 and w2 calculated with use of this example, the moving image encoder 2 can generate coded data #1 having a smaller coding amount.

Specific Example 1-5'

The following description will discuss a fifth example where the weighting factor calculation section 26*b* carries out a process for calculating weighting factors w1 and w2. In this example, the weighting factor calculation section 26b calculates the weighting factors w1 and w2 with use of Formulae (17) and (18), as in the (Specific Example 1-5) where the weighting factor calculation section 16b of the moving image decoder 1 carries out the process for calculating the weighting factors w1 and w2.

The use of the weighting factors w1 and w2 obtained based on Formulae (17) and (18) makes it possible to reduce an error caused by noise, and in addition, to generate a predicted image having a low amount of a prediction error. Further, by using the above method, coded data can be generated with good coding efficiency.

Second Embodiment (Moving Image Decoder 3)

Figure 10:
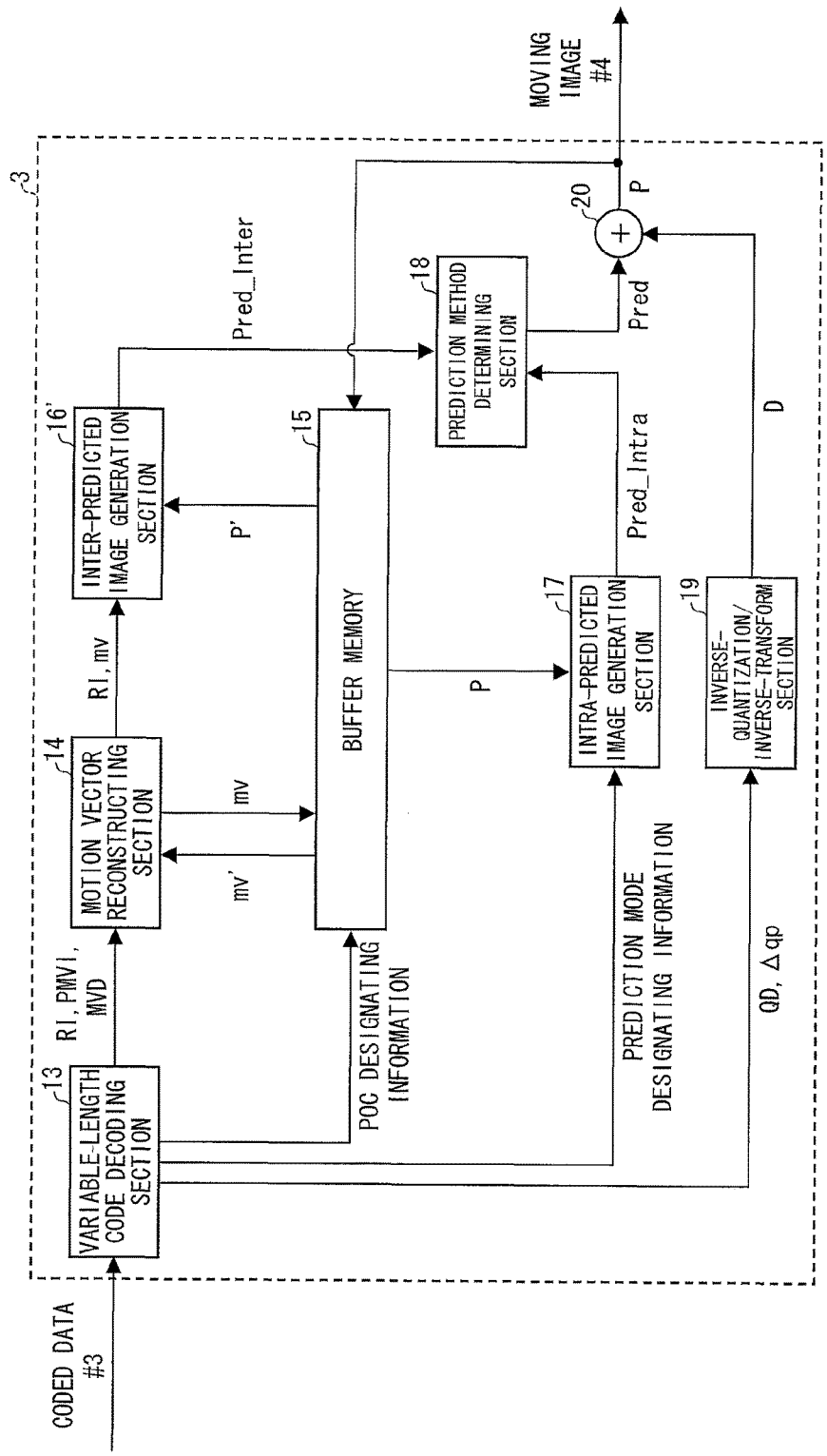
FIG. 10 is a block diagram showing a configuration of a moving image decoder in accordance with Second Embodiment.
Figure 11:
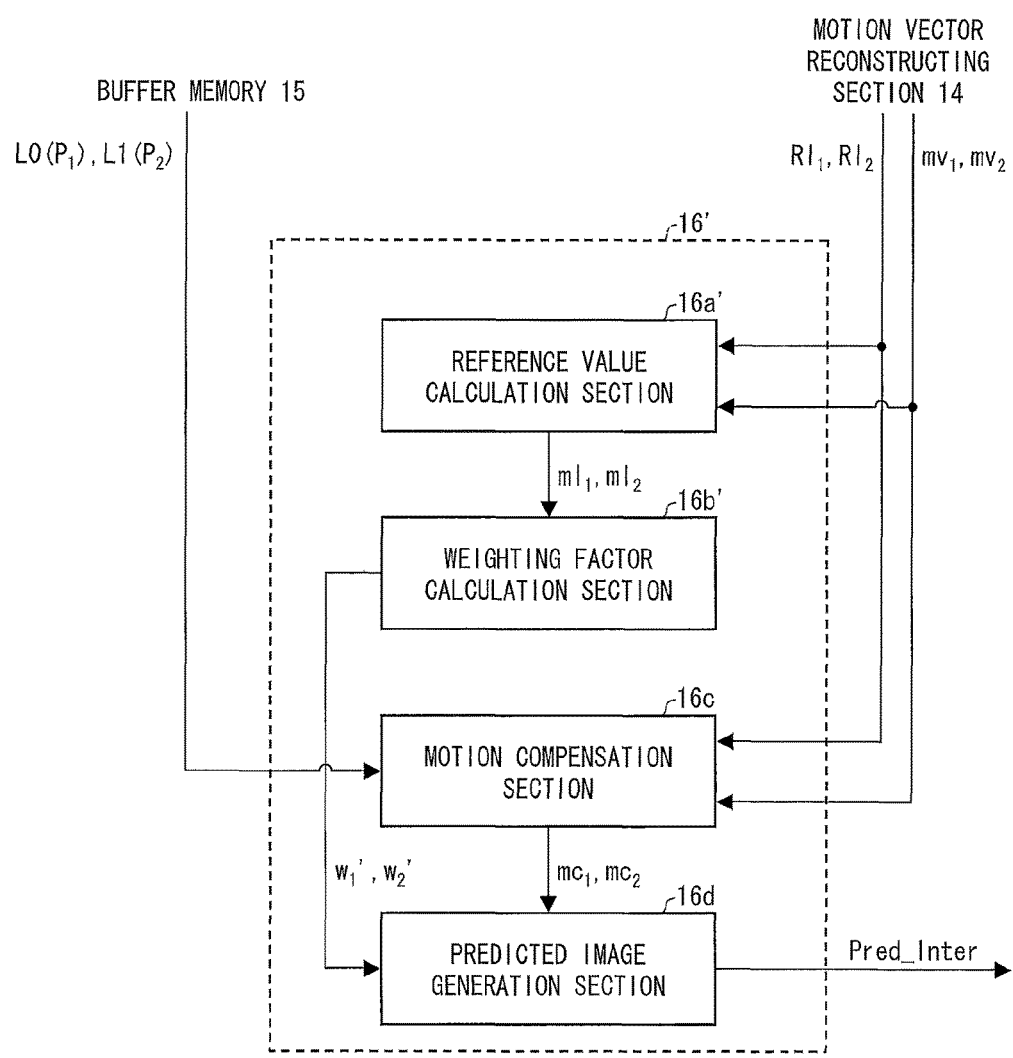
FIG. 11 is a block diagram showing a configuration of an inter-predicted image generation section of the moving image decoder shown in FIG. 10.

The following explains a configuration of a moving image decoder 3 in accordance with the present embodiment with reference to FIGS. 10 to 12. FIG. 10 is a block diagram showing the configuration of the moving image decoder 3. In FIG. 10, blocks which are the same as those shown in FIG. 1 are given the same reference marks and explanations thereof are omitted here.

As shown in FIG. 10, the moving image decoder 3 includes a variable-length code decoding section 13, a motion vector reconstructing section 14, a buffer memory 15, an inter-predicted image generation section 16', an intra-predicted image generation section 17, a prediction method determining section 18, an inverse quantization/inverse transform section 19, and an adder 20.

The moving image decoder 3 (the present embodiment) is different from the moving image decoder 1 (first embodiment) in that instead of the inter-predicted image generation section 16 which sets the weights w1 and w2 for weighted prediction based on POC designating information stored in the buffer memory 15, the moving image decoder 3 includes the inter-predicted image generation section 16' which sets the weights w1' and w2' for weighted prediction based on a motion vector mv reconstructed by the motion vector reconstructing section 14. The inter-predicted image generation section 16' is explained further specifically below.

(Inter-Predicted Image Generation Section 16')

Next, an explanation is made as to a configuration of the inter-predicted image generation section 16' with reference to FIG. 11. FIG. 11 is a block diagram showing a configuration of the inter-predicted image generation section 16'. As shown in FIG. 11, the inter-predicted image generation section 16' includes a reference value calculation section 16a', a weighting factor calculation section 16b', a motion compensation section 16c, and a predicted image generation section 16d. The inter-predicted image generation section 16' can carry out both unidirectional prediction and bidirectional prediction. An explanation is made below as to a configuration for carrying out bidirectional prediction (weighted prediction).

The reference value calculation section 16a' reads out, from the buffer memory 15, motion vectors mv1 and mv2 related to reference image indices RI1 and RI2, respectively. Then, the reference value calculation section 16a' calculates the size ml1 of the motion vector mv1 and the size ml2 of the motion vector mv2 (hereinafter the size ml1 of the motion vector mv1 is also referred to as "motion vector length ml1" and the size ml2 of the motion vector mv2 is also referred to as "motion vector length ml2"). The motion vector length ml1 and the motion vector length ml2 thus calculated are supplied to the weighing factor calculation section 16b'. How to calculate the motion vector length ml1 and the motion vector length ml2 will be specifically described later.

The weighting factor calculation section 16b' calculates weighting factors w1' and w2' based on the motion vector lengths ml1 and ml2 calculated by the reference value calculation section 16a', and supplies the weighting factors w1' and w2' to the predicted image generation section 16d. How to calculate the weighting factors w1' and w2' will be described later.

The motion compensation section 16c reads out, from the buffer memory 15, the reference image L0 (decoded image P1) and the reference image L1 (decoded image P2) designated by the reference image indices RI1 and RI2, respectively. Then, by motion compensation using the motion vectors mv1 and mv2, the motion compensation section 16c generates the motion compensated images mc1 and mc2 from the reference images L1 and L0, respectively, and supplies the motion compensated images mc1 and mc2 to the predicted image generation section 16d. How the motion compensation section 16c generates the motion compensated images mc1 and mc2 has been already described and so explanation thereof is omitted here.

Using the weighting factors w1' and w2' calculated by the weighting factor calculation section 16b' and the motion compensated images mc1 and mc2 generated by the motion compensation section 16c, the predicted image generation section 16d generates the inter-predicted image Pred_Inter and outputs it.

(Generation of Inter-Predicted Image Pred_Inter)

Next, with reference to FIG. 12, an explanation is made as to a process for generating the inter-predicted image Pred_Inter by the inter-predicted image generation section 16'. FIG. 12 is a view showing an example of the motion vector mv1 used in motion compensation referring to the reference image L0 and an example of the motion vector mv2 used in motion compensation referring to the reference image L1.

The reference value calculation section 16' calculates the motion vector length ml1 which is the size of the motion vector mv1, in accordance with Formula (19) below.

[Mathematical Formula 12]

$$ml1 = \text{abs}(mv1) \qquad (19)$$
$$= \sqrt{mv1x^2 + mv1y^2}$$

Here, abs ( . . . ) indicates the absolute value of the parenthesized value. $mv1x$ and $mv1y$ indicate x-component and y-component of the motion vector mv1, respectively.

Similarly, the reference value calculation section 16a' calculates the motion vector length ml2 which is the size of the motion vector mv2, in accordance with Formula (20) below.

[Mathematical Formula 13]

$$ml2 = \text{abs}(mv2) \qquad (20)$$
$$= \sqrt{mv2x^2 + mv2y^2}$$

Here, $mv2x$ and $mv2y$ indicate x-component and y-component of the motion vector mv2, respectively. Calculation of the motion vector length may be made by methods other than formulae (19) and (20) above, e.g. by addition of the absolute value of x-component and the absolute value of y-component.

Using the motion vector lengths ml1 and ml2 calculated by the reference value calculation section 16a', the weighting factor calculation section 16b' calculates the weighting factors w1' and w2' to be used in weighted prediction. How to calculate the weighting factors w1' and w2' will be specifically explained in (Specific Example 2-1) to (Specific Example 2-3) below.

Assume that the weighting factor by which each pixel value of the motion compensated image mc1 is to be multiplied is a weighting factor w1' and the weighting factor by which each pixel value of the motion compensated image mc2 is to be multiplied is a weighting factor w2'. At that time, the predicted image generation section 16d generates the pixel value pred (x, y) of each pixel of the inter-predicted image Pred_Inter based on Formula (7').

$$pred(x,y)=w1'\times mc1(x,y)+w2'\times mc2(x,y)+o \quad (7')$$

Here, o represents an offset value and (x, y) represents coordinates of a target pixel. The weighting factors w1' and w2' represent weighting factors that meet a relation w1'+w2'=1.

(Specific Examples of Process for Calculating Weighting Factor)

The following description will discuss Specific Examples of how the weighting factor calculation section 16b' calculates weighting factors w1' and w2'.

The weighting factor calculation section 16b' carries out any of calculation processes described in the following (Specific Example 2-1) to (Specific Example 2-3) so as to calculate weighting factors w1' and w2' by which respective pixel values of motion compensated images are to be multiplied in Formula (7'). In any of the Specific Examples, in a case where ml1<ml2 (where ml1 and ml2 are lengths of motion vectors mv1 and mv2 used in motion compensation for obtaining motion compensated images mc1 and mc2, respectively), the weighting factors w1' and w2' meet a relation |w1'|≥|w2'|.

Specific Example 2-1

The following description will discuss a first example of how the weighting factor calculation section 16b' calculates weighting factors w1' and w2'.

In the present example, when a ratio of weighting factors w1' and w2' obtained by referring to motion vector lengths is largely different from 1:1, the weighting factors w1' and w2' are set to respective predetermined values, and when otherwise, the weighting factors w1' and w2' are set to a ratio of the motion vector lengths.

The weighting factor calculation section 16b' calculates, based on Formulae (21) and (22), weighting factors w1' and w2' with the use of ml1 and ml2 calculated by the reference value calculation section 16a'.

$$w2'=clip3(th1,th2,ml1/(ml1+ml2)) \quad (21)$$

$$w1'=1-w2' \quad (22)$$

where th1 and th2 indicate lower and upper thresholds in a clipping process, respectively, and are set so that optimal weighting factors w1' and w2' that provide high coding efficiency can be calculated. The present example employs th1=0.33 and th2=0.67, but is not limited to those as long as a relation th1<0.5<th2 is met.

The weighting factor calculation section 16b' can improve prediction accuracy by carrying out the operation of the present example, i.e., by using a ratio of motion vector lengths as weighting factors. Further, in a case where the ratio of motion vector lengths is largely different from 0.5, the weighting factor calculation section 16b' can suppress an increase in noise by carrying out the above described clipping process.

Therefore, a moving image encoder which has means similar to the weighting factor calculation section 16b' that carries out the operation of the present example can generate coded data with high coding efficiency.

Moreover, the moving image decoder 3 which includes the weighting factor calculation section 16b' that carries out the operation of the present example can appropriately decode the coded data thus generated with high coding efficiency.

Specific Example 2-2

The following description will discuss a second example of how the weighting factor calculation section 16b' calculates weighting factors w1' and w2'.

In the present example, the weighting factor w2' is determined by comparing a motion vector length ml1 and a motion vector length ml2.

The weighting factor calculation section 16b' sets the weighting factor w2' by using the motion vector lengths ml1 and ml2 calculated by the reference value calculation section 16a'.

Specifically, (1) in a case where the motion vector length ml1 is shorter than a value obtained by subtracting a threshold k from the motion vector length ml2 (i.e., ml1<ml2−k), w2' is set to th1', (2) in a case where the motion vector length ml1 is equal to or longer than the value obtained by subtracting the threshold k from the motion vector length ml2 and is equal to or shorter than a value obtained by adding the threshold k to the motion vector length ml2 (i.e., (ml1>=ml2−k) && (ml1<=ml2+k), where "A&&B" means "A and B"), w2' is set to 0.5, and (3) in a case where the motion vector length ml1 is longer than the value obtained by adding the threshold k to the motion vector length ml2 (i.e., ml1>ml2+k), w2' is set to th2'.

Note that the threshold k varies depending on a partition size. In a case where, for example, the partition size is 16×16 pixels, the threshold k is 8.

Moreover, th1' and th2' can be set so that optimal weighting factors w1' and w2' that provide high coding efficiency can be calculated. For example, th1' and th2' can be set to 0.33 and 0.67, respectively, but are not limited to those as long as a relation th1'<0.5<th2' is met.

Further, the weighting factor calculation section 16b' calculates, based on Formula (22), a weighting factor w1' by using the weighting factor w2' which has been set to any of the above values (1) through (3).

This allows a ratio of the weighting factors w1' and w2' to be approximate to 1:1, and it is therefore possible to further reduce an error caused by a noise.

Specific Example 2-3

The following description will discuss a third example of how the weighting factor calculation section 16b' calculates weighting factors w1' and w2'.

In the present example, weight is calculated based on motion vector lengths only in a case where a ratio of inter-frame distances is 1:1. Note that the present example may be carried out by employing a configuration in which (i) the reference value calculation section 16a included in the moving image decoder 1 of First Embodiment is added to the inter-predicted image generation section 16' and (ii) inter-frame distances tb and td calculated by the reference value calculation section 16a are supplied to the weighting factor calculation section 16b'.

The weighting factor calculation section 16b' calculates a weighting factor w2 based on a motion vector length ml1, a motion vector length ml2, an inter-frame distance tb, and an inter-frame distance td which have been calculated by the reference value calculation section 16a'.

Specifically, the weighting factor calculation section 16b' judges whether or not a ratio of (i) a distance from one of two reference frames to a prediction target frame and (ii) a distance from the other of the two reference frames to the prediction target frame is 1:1, that is, whether or not tb/td=0.5, and, in a case where the ratio of distances from the two reference frames to the prediction target frame is 1:1, that is, tb/td=0.5, the weighting factor calculation section 16b' calculates a weighting factor w2' based on the following Formula (23):

$$w2'=ml1/(ml1+ml2) \quad (23)$$

In a case where tb/td is not 0.5, the weighting factor calculation section 16b' sets the weighting factor w2' to tb/td. Alternatively, the weighting factor w2' can be suitably set to a value calculated in First Embodiment.

Moreover, the weighting factor calculation section 16b' calculates, based on Formula (22), a weighting factor w1' by using the calculated weighting factor w2'.

As such, in a case where the ratio of inter-frame distances is 1:1, it is possible to reduce an error, which is caused by a noise that can be caused in a reference image having a small correlation, by multiplying a reference image having a long motion vector length by smaller weight.

According to the above explanation, the reference value calculation section 16a' supplies, to the weighting factor calculation section 16b', the inter-frame distance tb and the inter-frame distance td having been calculated by a configuration similar to the reference value calculation section 16a of the moving image decoder 1, in addition to the motion vector length ml1 and the motion vector length ml2. Note, however, that the present example is not limited to this. For example, it is possible to employ a configuration in which the reference value calculation section 16a' (i) judges whether or not tb/td=0.5 and (ii) supplies judgment information indicative of the judgment result to the weighting factor calculation section 16b'. In a case where the reference value calculation section 16a' is configured as such, the weighting factor calculation section 16b' can be configured, if tb/td=0.5, to calculate the weighting factor w2' based on Formula (23) by referring to the judgment information.

(Moving Image Encoder 4)

Figure 13:
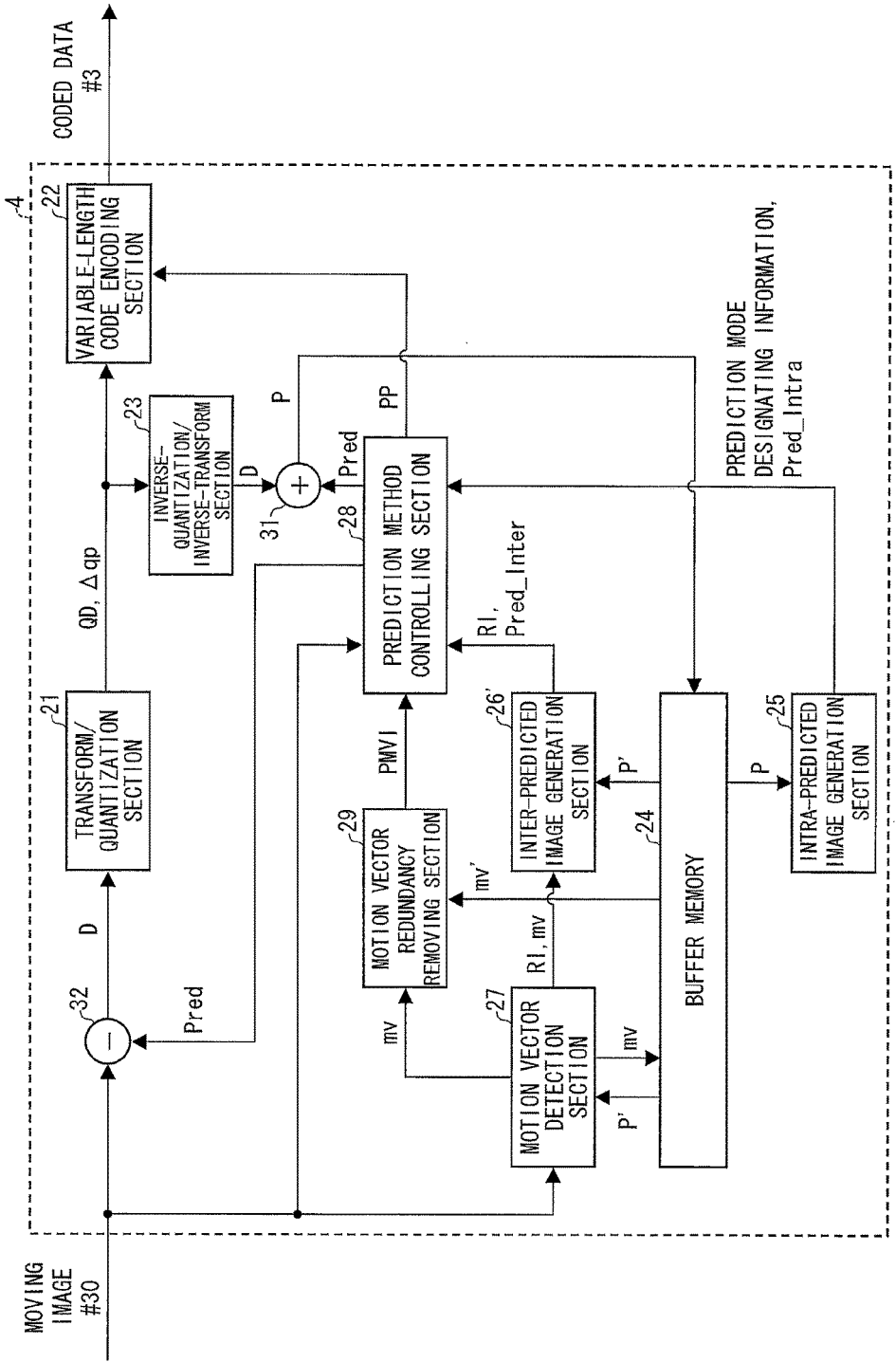
FIG. 13 is a block diagram showing a configuration of a moving image encoder in accordance with Second Embodiment.
Figure 14:
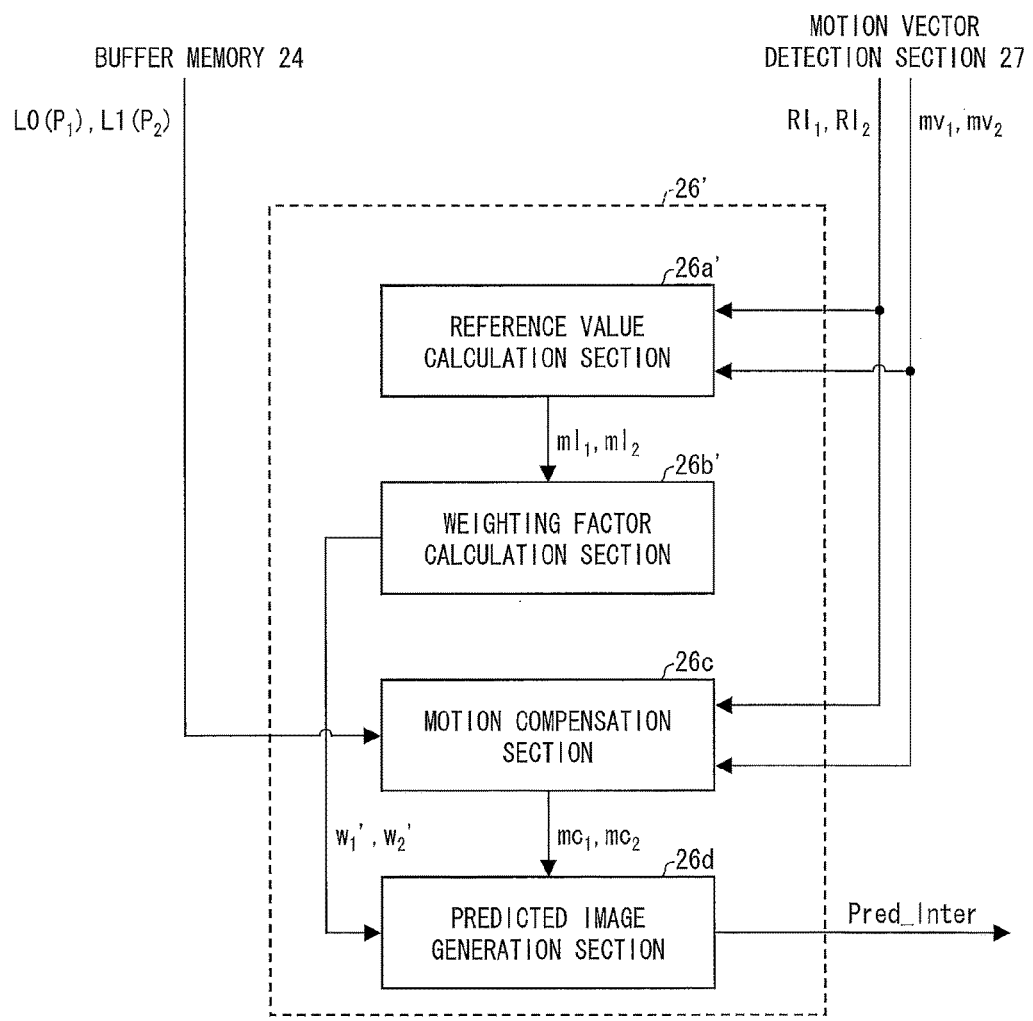
FIG. 14 is a block diagram showing a configuration of an inter-predicted image generation section of the moving image encoder shown in FIG. 13.

The following description will discuss, with reference to FIGS. 13 and 14, a configuration of a moving image encoder 4 in accordance with the present embodiment. FIG. 13 is a block diagram showing the configuration of the moving image encoder 4. Note that, in FIG. 13, blocks which are identical with those shown in FIG. 7 are given the same reference marks and explanation thereof is omitted here.

As illustrated in FIG. 13, the moving image encoder 4 includes a transform/quantization section 21, a variable-length code encoding section 22, an inverse quantization/inverse transform section 23, a buffer memory 24, an intra-predicted image generation section 25, an inter-predicted image generation section 26', a motion vector detection section 27, a prediction method controlling section 28, a motion vector redundancy removing section 29, an adder 31, and a subtractor 32. The moving image encoder 4 is a device for encoding a moving image #30 to generate coded data #3.

The moving image encoder 4 (present embodiment) is different from the moving image encoder 2 (First Embodiment) in that the moving image encoder 4 includes the inter-predicted image generation section 26' which determines weights w1' and w2' for weighted prediction on the basis of a motion vector mv detected by the motion vector detection section 27, instead of including the inter-predicted image generation section 26 which determines weights w1 and w2 for weighted prediction on the basis of POC designating information stored in the buffer memory 24. The inter-predicted image generation section 26' will be specifically described below.

(Inter-Predicted Image Generation Section 26')

FIG. 14 is a block diagram showing a configuration of the inter-predicted image generation section 26'. As shown in FIG. 14, the inter-predicted image generation section 26' includes a reference value calculation section 26a', a weighting factor calculation section 26b', a motion compensation section 26c, and a predicted image generation section 26d.

The reference value calculation section 26a', the weighting factor calculation section 26b', the motion compensation section 26c, and the predicted image generation section 26d which are included in the inter-predicted image generation section 26' of the moving image encoder 4 have functions equivalent to those of the reference value calculation section 16a', the weighting factor calculation section 16b', the motion compensation section 16c, and the predicted image generation section 16d which are included in the inter-predicted image generation section 16' of the moving image decoder 3.

Note, however, that, in the moving image decoder 3, reference image indices R1 and R2 and motion vectors mv1 and mv2 are supplied from the motion vector reconstructing section 14, whereas in the moving image encoder 4, these are supplied from the motion vector detection section 27. Further, in the moving image decoder 3, the reference images L0 and L1 are read out from the buffer memory 15, whereas in the moving image encoder 4, these are read out from the buffer memory 24.

(Specific Examples of Process for Calculating Weighting Factor)

The following description will discuss specific examples where the weighting factor calculation section 26b' carries out a process for calculating weighting factors w1' and w2'. The weighting factor calculation section 26b' carries out one of the following calculation processes ((Specific Example 2-1') to (Specific Example 2-3')).

Specific Example 2-1'

The following description will discuss a first example where the weighting factor calculation section 26b' carries out a process for calculating weighting factors w1' and w2'. In this example, the weighting factor calculation section 26b' calculates the weighting factors w1' and w2' with use of Formulae (21) and (22), as in the (Specific Example 2-1) where the weighting factor calculation section 16b' of the moving image decoder 3 carries out the process for calculating the weighting factors w1' and w2'.

In the inter-predicted image Pred_Inter generated with use of the weighting factors w1' and w2' calculated as described above, an error caused by noise is reduced. The moving image encoder 4 can therefore generate coded data #3 having a smaller coding amount.

The moving image encoder 4, in which this example is employed, can therefore reduce the coding amount of the coded data #3.

Specific Example 2-2'

The following description will discuss a second example where the weighting factor calculation section 26b' carries out a process for calculating weighting factors w1' and w2'. In this example, as in the (Specific Example 2-2) where the weighting factor calculation section 16b' of the moving image decoder 3 carries out the process for calculating the weighting factors w1' and w2', the weighting factor w2' is set to be any one of values (1) to (3) explained in (Specific Example 2-2) with use of motion vector lengths ml1 and ml2.

The weighting factor w1' is calculated based on Formula (22) with use of the weighting factor w2', as in the (Specific Example 2-2).

In the-inter-predicted image Pred_Inter generated with use of the weighting factors w1' and w2' calculated as described above, an error caused by noise is reduced. The moving image encoder 4 can therefore generate coded data #3 having a smaller coding amount.

Specific Example 2-3'

The following description will discuss a third example where the weighting factor calculation section 26b' carries out a process for calculating weighting factors w1' and w2'. In this example, the weighting factor w2' is calculated based on Formula (23) as in the (Specific example 2-3) where the weighting factor calculation section 16b' of the moving image decoder 3 carries out the process for calculating the weighting factors w1' and w2', or the weighting factor w2' is set to 0.5.

The weighting factor w1' is calculated based on Formula (22) with use of the weighting factor w2', as in the (Specific Example 2-3).

In a case where a ratio of inter-frame distances is 1:1, a smaller weight is applied on a reference image having a larger motion vector length with use of the weighting factors w1' and w2' calculated as above. This makes it possible to reduce an error caused by noise that could be generated in a reference image having a small correlation. Accordingly, the moving image encoder 4 can ultimately generate coded data #3 having a smaller coding amount.

Third Embodiment (Moving Image Decoder 5)

Figure 15:
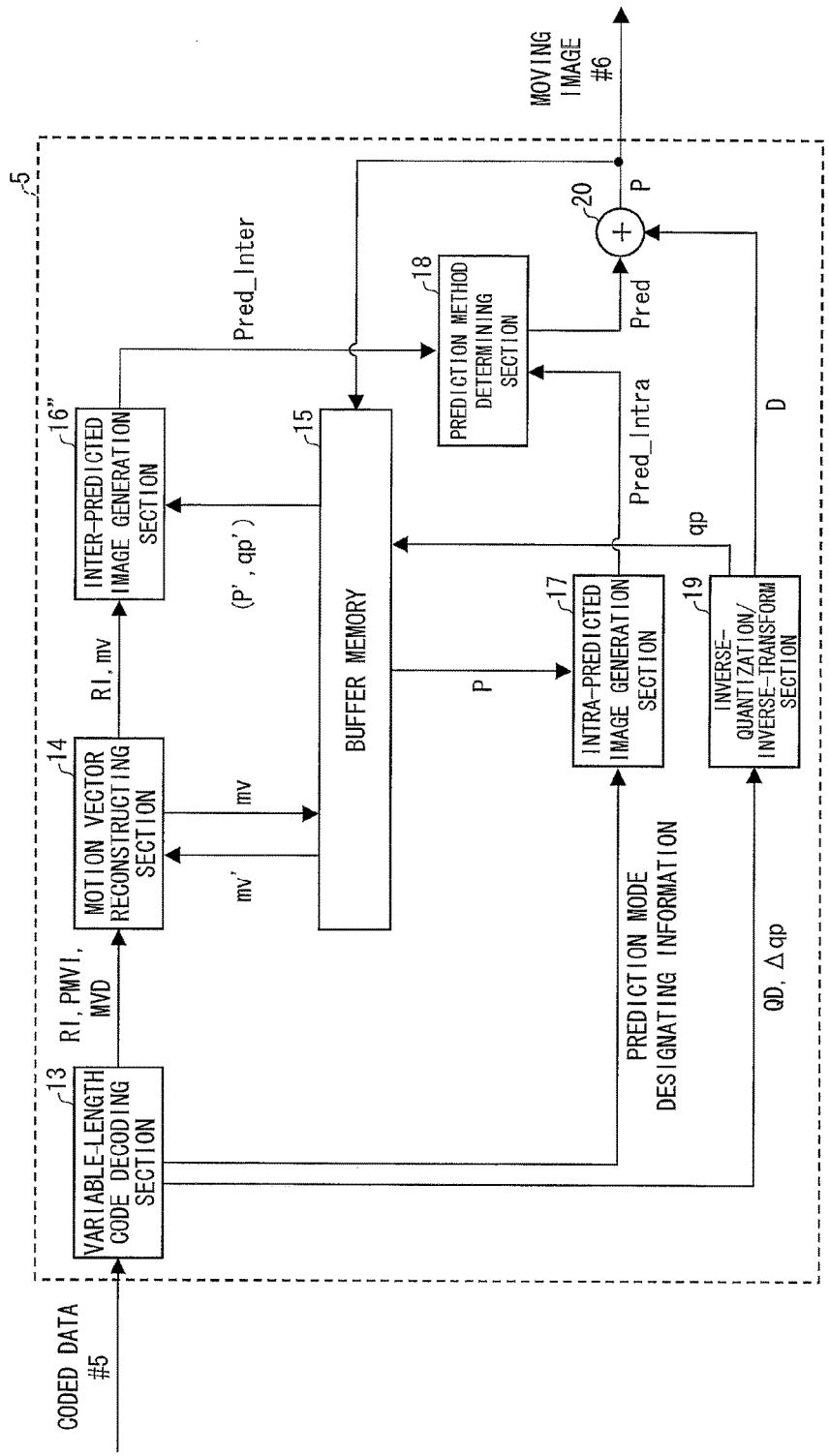
FIG. 15 is a block diagram showing a configuration of a moving image decoder in accordance with Third Embodiment.
Figure 16:
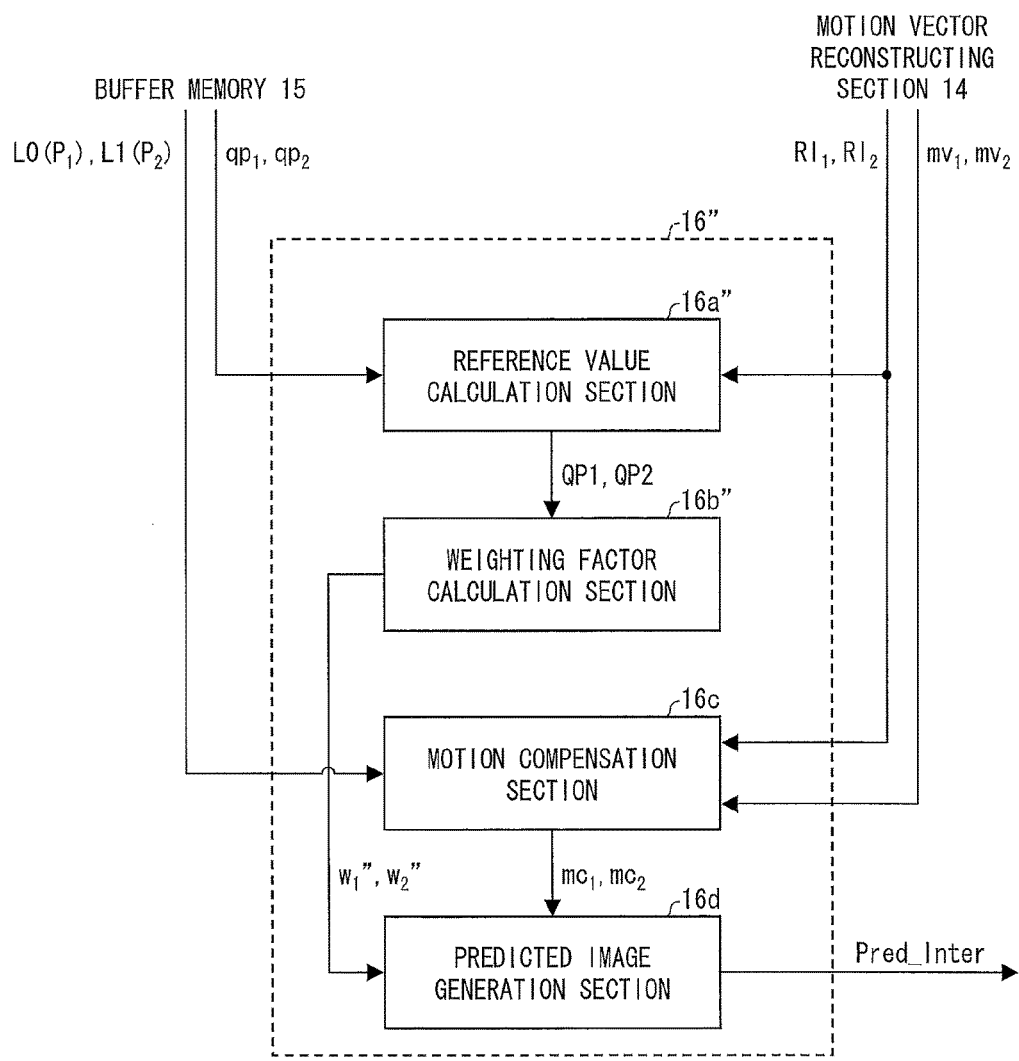
FIG. 16 is a block diagram showing a configuration of an inter-predicted image generation section of the moving image decoder in accordance with Third Embodiment.

The following explains a configuration of the moving image decoder 5 in accordance with the present embodiment with reference to FIGS. 15 to 17. FIG. 15 is a block diagram showing the configuration of the moving image decoder 5. In FIG. 15, blocks which are the same as those shown in FIG. 1 are given the same reference marks and explanations thereof are omitted here.

As shown in FIG. 15, the moving image decoder 5 includes a variable-length code decoding section 13, a motion vector reconstructing section 14, a buffer memory 15, an inter-predicted image generation section 16", an intra-predicted image generation section 17, a prediction method determining section 18, an inverse quantization/inverse transform section 19, and an adder 20.

A first difference between the moving image decoder 5 (the present embodiment) and the moving image decoder (First Embodiment) lies in that the inverse-quantization/inverse-transform section 19 of the moving image decoder 5 stores a quantization parameter qp in the buffer memory 15 in such a manner that the quantization parameter qp is related to a decoded image P in the process of decoding. A second difference lies in that instead of the inter-predicted image generation section 16 which sets the weights w1 and w2 for weighted prediction based on POC designating information stored in the buffer memory 15, the moving image decoder 5 includes the inter-predicted image generation section 16" which sets the weights w1" and w2" for weighted prediction based on a quantization parameter qp' stored in the buffer memory 15 by the inverse-quantization/inverse-transform section 19. The inter-predicted image generation section 16" is explained further specifically below.

(Inter-Predicted Image Generation Section 16")

Next, an explanation is made as to a configuration of the inter-predicted image generation section 16" with reference to FIG. 16. FIG. 16 is a block diagram showing a configuration of the inter-predicted image generation section 16". As shown in FIG. 16, the inter-predicted image generation section 16" includes a reference value calculation section 16a", a weighting factor calculation section 16b", a motion compensation section 16c, and a predicted image generation section 16d. The inter-predicted image generation section 16" can carry out both unidirectional prediction and bidirectional prediction. An explanation is made below as to a configuration for carrying out bidirectional prediction (weighted prediction).

The reference value calculation section 16a" reads out, from the buffer memory 15, quantization parameters qp1 and qp2 related to decoded images P1 and P2 designated by reference image indices RI1 and RI2 (hereinafter referred to as reference images L0 and L1, respectively). Then, based on the quantization parameters qp1 and qp2 thus read out, the reference value calculation section 16a" calculates quantization steps QP1 and QP2 used in decoding the reference images L0 and L1. How to calculate the quantization steps QP1 and QP2 will be specifically described later.

The weighting factor calculation section 16b" calculates weighting factors w1" and w2" based on the quantization steps QP1 and QP2 calculated by the reference value calculation section 16a", and supplies the weighting factors w1" and w2" to the predicted image generation section 16d. How to calculate the weighting factors w1" and w2" will be described later.

The motion compensation section 16c reads out, from the buffer memory 15, the reference image L0 (decoded image P1) and the reference image L1 (decoded image P2) which are designated by the reference image indices RI1 and RI2, respectively. Then, by motion compensation using the motion vectors mv1 and mv2, the motion compensation section 16c generates the motion compensated images mc1 and mc2 from the reference images L1 and L0, respectively, and supplies the motion compensated images mc1 and mc2 to the predicted image generation section 16d. How the motion compensation section 16c generates the motion compensated images mc1 and mc2 has been already described and so explanation thereof is omitted here.

Using the weighting factors w1 and w2 calculated by the weighting factor calculation section 16b and the motion compensated images mc1 and mc2 generated by the motion compensation section 16c, the predicted image generation section 16d generates the inter-predicted image Pred_Inter and outputs it.

(Generation of Inter-Predicted Image Pred_Inter)

Next, with reference to FIG. 17, an explanation is made as to a process for generating the inter-predicted image Pred_Inter by the inter-predicted image generation section 16″. FIG. 17 is a view showing an example of the motion vector mv1 used in motion compensation referring to the reference image L0 and an example of the motion vector mv2 used in motion compensation referring to the reference image L1.

The reference value calculation section 16a″ calculates the quantization step QP1 in accordance with Formula (24) below.

[Mathematical Formula 14]

$$QP1 = 2^{qp1/6} \qquad (24)$$

Here, qp1/6 indicates a quotient obtained by dividing qp1 by 6.

Furthermore, the reference value calculation section 16a″ calculates the quantization step QP1 in accordance with Formula (25) below.

[Mathematical Formula 15]

$$QP2 = 2^{qp2/6} \qquad (25)$$

Here, qp2/6 indicates a quotient obtained by dividing qp2 by 6.

Using the quantization steps QP1 and QP2 calculated by the reference value calculation section 16a″, the weighting factor calculation section 16b″ calculates the weighting factors w1″ and w2″. How to calculate the weighting factors w1″ and w2″ will be specifically explained in (Specific Example 3-1) to (Specific Example 3-3) below.

The predicted image generation section 16d generates the pixel value pred (x, y) of each pixel of the inter-predicted image Pred_Inter based on Formula (7″).

$$pred(x,y) = w1'' \times mc1(x,y) + w2'' \times mc2(x,y) + o \qquad (7'')$$

Here, o represents an offset value and (x, y) represents coordinates of a target pixel. The weighting factors w1″ and w2″ represent weighting factors that meet a relation w1″+w2″=1.

(Specific Examples of Process for Calculating Weighting Factor)

The following description will discuss Specific Examples of how the weighting factor calculation section 16b″ calculates weighting factors w1″ and w2″.

The weighting factor calculation section 16b″ carries out one of calculation processes described in the following (Specific Example 3-1) to (Specific Example 3-3) so as to calculate weighting factors w1″ and w2″ by which pixel values of motion compensated images are multiplied in Formula (7). In any of the Specific Examples, in a case where $QP_1 < QP_2$ (where $QP_1$ and $QP_2$ are quantization steps used in inverse quantization for obtaining reference images L0 (decoded image P1) and L1 (decoded image P2), respectively), the weighting factors $w_1''$ and $w_2''$ meet a relation $|w_1''| \geq |w_2''|$.

Specific Example 3-1

The following description will discuss a first example of how the weighting factor calculation section 16b″ calculates weighting factors w1″ and w2″.

In the present example, when a ratio of weighting factors w1″ and w2″ obtained by referring to quantization steps is largely different from 1:1, weighting factors w1″ and w2″ are set to respective predetermined values, and when otherwise, the weighting factors w1″ and w2″ are set to be a ratio of the quantization steps.

The weighting factor calculation section 16b″ calculates, based on Formulae (26) and (27), weighting factors w1″ and w2″ by using quantization steps QP1 and QP2 calculated by the reference value calculation section 16a″.

$$w2'' = \text{clip3}(th1, th2, QP1/(QP1+QP2)) \qquad (26)$$

$$w1'' = 1 - w2'' \qquad (27)$$

where th1 and th2 indicate lower and upper thresholds for a clipping process, respectively, and are set so that optimal weighting factors w1″ and w2″ that provide high coding efficiency can be calculated. The present example employs th1=0.33 and th2=0.67, but is not limited to this as long as a relation th1<0.5<th2 is met.

The weighting factor calculation section 16b″ can improve prediction accuracy by carrying out the operation of the present example, i.e., by using a ratio of quantization steps as weighting factors. Further, in a case where the ratio of quantization steps is largely different from 0.5, the weighting factor calculation section 16b″ can suppress an increase in noise by carrying out the above described clipping process.

Specific Example 3-2

The following description will discuss a second example of how the weighting factor calculation section 16b″ calculates weighting factors w1″ and w2″.

In the present example, a quantization parameter qp1 is used as the quantization step QP1, instead of a value calculated based on Formula (24). That is, QP1=qp1. The same applies to the quantization parameter QP2, that is, QP2=qp2.

The weighting factor calculation section 16b″ calculates a weighting factor w2″ with the use of the quantization steps QP1 and QP2.

Specifically, (1) in a case where the quantization step QP1 is smaller than a value obtained by subtracting TH from the quantization step QP2 (i.e., QP1<QP2−TH), w2 is set to th1′, (2) in a case where the quantization step QP1 is equal to or larger than the value obtained by subtracting TH from the quantization step QP2 and is equal to or smaller than a value obtained by adding TH to the quantization step QP2 (i.e., (QP1>=QP2−TH) && (QP1<=QP2+TH)), w2 is set to 0.5, and (3) in a case where the quantization step QP1 is larger than the value obtained by adding TH to the quantization step QP2 (i.e., QP1>QP2+6), w2 is set to th2′. Note that TH is a predetermined threshold, and TH=6 in the present example.

Specifically, (1) in a case where the quantization step QP1 is smaller than a value obtained by subtracting 6 from the quantization step QP2 (i.e., |QP1|<|QP2|−6), w2″ is set to th1′, (2) in a case where the quantization step QP1 is equal to or larger than the value obtained by subtracting 6 from the quantization step QP2 and is equal to or smaller than a value obtained by adding 6 to the quantization step QP2 (i.e., (|QP1|>=|QP2|−6) && (|QP1|<=|QP2|+6)), w2″ is set to 0.5, and (3) in a case where the quantization step QP1 is larger than the value obtained by adding 6 to the quantization step QP2 (i.e., |QP1|>|QP2|+6), w2″ is set to th2′.

Moreover, th1′ and th2′ can be set so that optimal weighting factors w1″ and w2″ that provide high coding efficiency can be calculated. For example, th1' and th2' can be set to 0.33 and 0.67, respectively, but are not limited to those as long as a relation th1'<0.5<th2' is met.

Further, the weighting factor calculation section 16b'' calculates, based on Formula (27), a weighting factor w1 by using the weighting factor w2'' which has been set to one of the above values (1) to (3).

Specific Example 3-3

The following description will discuss a third example of how the weighting factor calculation section 16b'' calculates weighting factors w1'' and w2''.

In the present example, weight is calculated based on quantization steps only in a case where a ratio of inter-frame distances is 1:1. Note that the present example may be carried out by employing a configuration in which (i) the reference value calculation section 16a included in the moving image decoder 1 of First Embodiment is added to the inter-predicted image generation section 16' and (ii) inter-frame distances tb and td calculated by the reference value calculation section 16a are supplied to the weighting factor calculation section 16b'.

The weighting factor calculation section 16b'' calculates a weighting factor w2'' with the use of a quantization step QP1, a quantization step QP2, an inter-frame distance tb, and an inter-frame distance td which have been calculated by the reference value calculation section 16a''.

Specifically, the weighting factor calculation section 16b'' judges whether or not a ratio of (i) a distance between one of two reference frames and a prediction target frame and (ii) a distance between the other of the two reference frames and the prediction target frame is 1:1, that is, whether or not tb/td=0.5, and in a case where the ratio of distances from the two reference frames to the prediction target frame is 1:1, that is, tb/td=0.5, the weighting factor calculation section 16b'' calculates a weighting factor w2'' based on the following Formula (28):

$$w2''=QP1/(QP1+QP2) \qquad (28)$$

In a case where tb/td is not 0.5, the weighting factor calculation section 16b' sets the weighting factor w2'' to tb/td. Alternatively, the weighting factor w2'' can be suitably set to a value calculated in First Embodiment.

Moreover, the weighting factor calculation section 16b'' calculates, based on Formula (27), a weighting factor w1 with the use of the calculated weighting factor w2''.

As such, in a case where the ratio of inter-frame distances is 1:1, it is possible to reduce an error, which is caused by a noise that can be caused in a reference image having a small correlation, by multiplying a reference image having a large quantization step by smaller weight.

(Moving Image Encoder 6)

Figure 18:
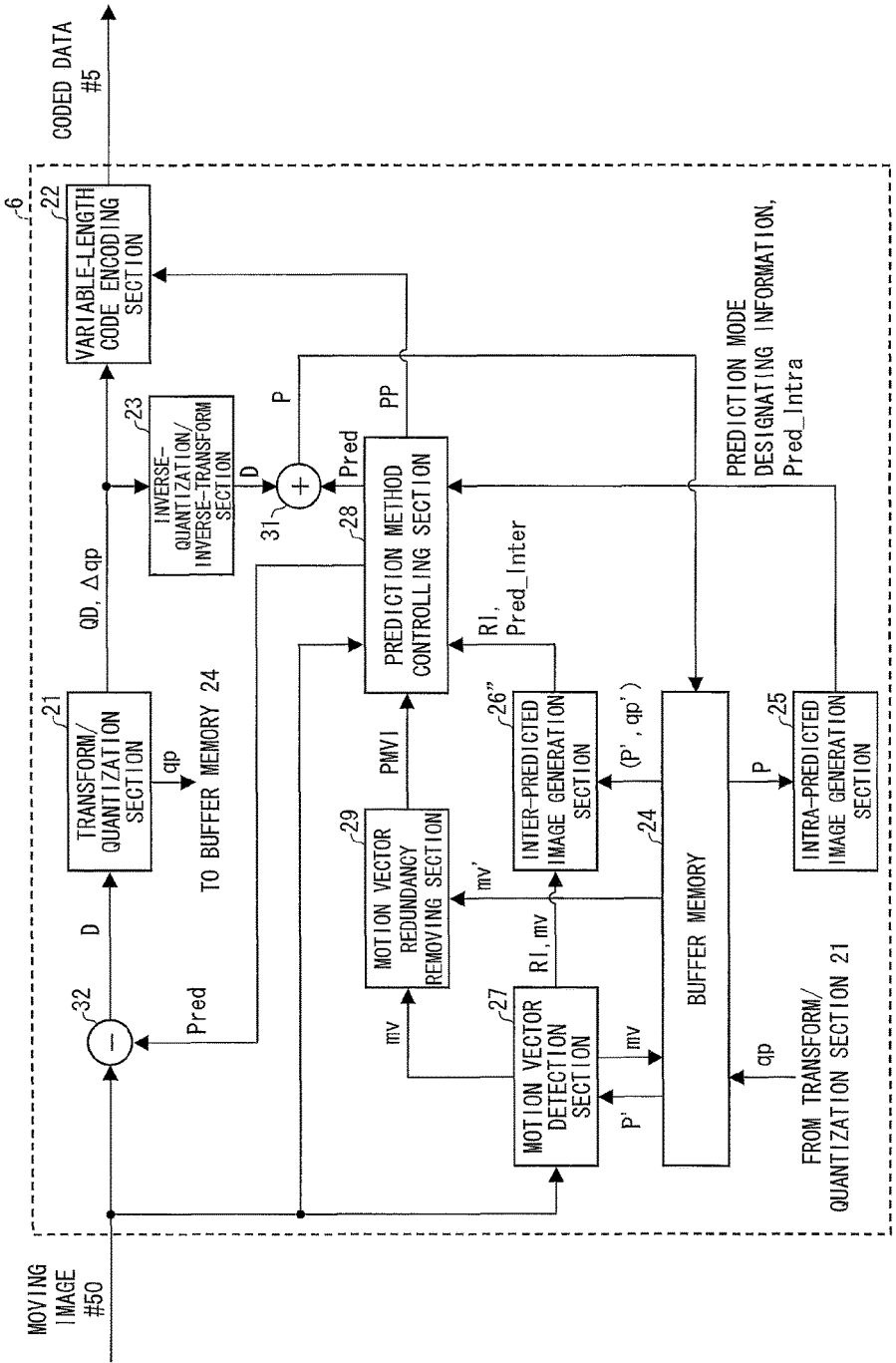
FIG. 18 is a block diagram showing a configuration of a moving image encoder in accordance with Third Embodiment.
Figure 19:
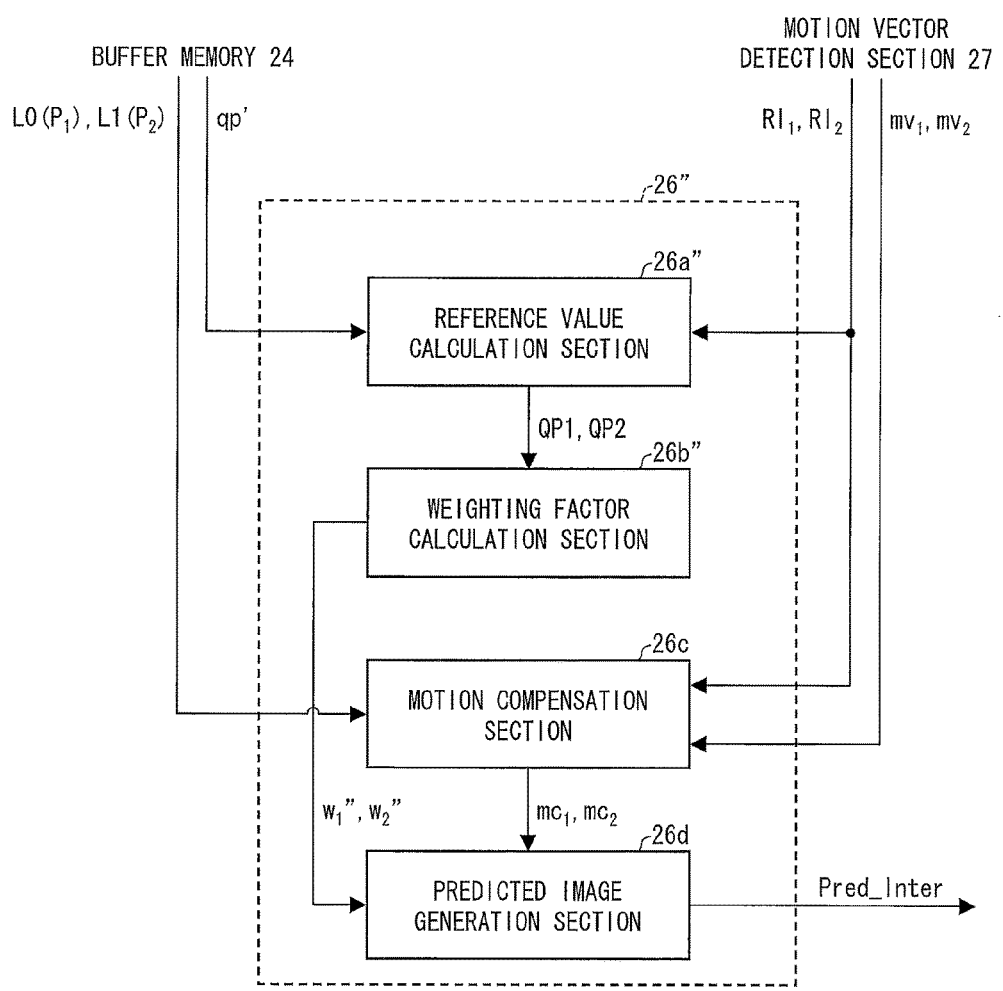
FIG. 19 is a block diagram showing a configuration of an inter-predicted image generation section of the moving image encoder shown in FIG. 18.
Figure 20:
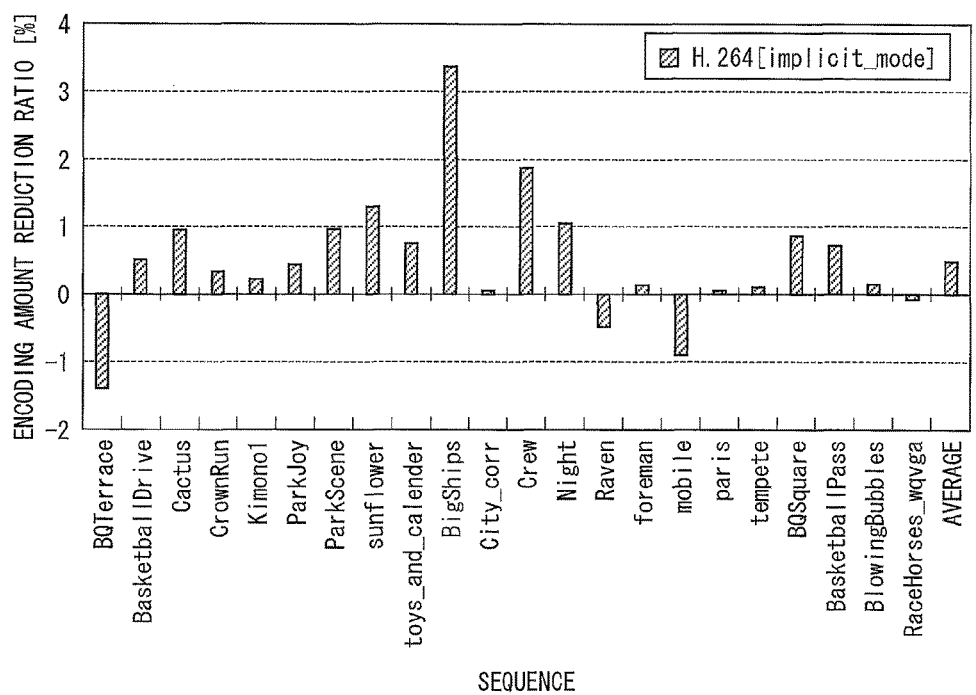
FIG. 20 is a graph showing a coding amount reduction ratio with respect to each sequence in coded data encoded by using an Implicit mode of the H. 264/MPEG-4 AVC standard.

The following description will discuss, with reference to FIGS. 18 and 19, a configuration of the moving image encoder 6 in accordance with the present embodiment. FIG. 18 is a block diagram showing the configuration of the moving image encoder 6. Note that, in FIG. 18, partitions which are identical with those shown in FIG. 7 are given the same reference marks and explanations thereof are omitted.

As illustrated in FIG. 18, the moving image encoder 6 includes a transform/quantization section 21, a variable-length code encoding section 22, an inverse quantization/inverse transform section 23, a buffer memory 24, an intra-predicted image generation section 25, an inter-predicted image generation section 26'', a motion vector detection section 27, a prediction method controlling section 28, a motion vector redundancy removing section 29, an adder 31, and a subtractor 32.

The moving image encoder 6 (the present embodiment) is different from the moving image encoder 2 (First Embodiment) in the following two points: (1) the transform/quantization section 21 stores a quantization parameter qp in the buffer memory 24 in such a manner that the quantization parameter qp is related to a decoded image P in the process of decoding; and (2) the moving image encoder 6 includes the inter-predicted image generation section 26'' which sets weights w1'' and w2'' for weighted prediction based on a quantization parameter qp' stored in the buffer memory 24 by the transform/quantization section 21, instead of including the inter-predicted image generation section 26 which sets weights w1 and w2 for weighted prediction based on POC designating information stored in the buffer memory 24. The inter-predicted image generation section 26'' will be specifically described below.

(Inter-Predicted Image Generation Section 26'')

FIG. 19 is a block diagram showing a configuration of the inter-predicted image generation section 26''. As illustrated in FIG. 19, inter-predicted image generation section 26'' includes a reference value calculation section 26a'', a weighting factor calculation section 26b'', a motion compensation section 26c, and a predicted image generation section 26d.

The reference value calculation section 26a'', the weighting factor calculation section 26b'', the motion compensation section 26c, and the predicted image generation section 26d which are included in the inter-predicted image generation section 26'' of the moving image encoder 6 have functions equivalent to those of the reference value calculation section 16a'', the weighting factor calculation section 16b'', the motion compensation section 16c, and the predicted image generation section 16d which are included in the inter-predicted image generation section 16'' of the moving image decoder 5.

Note however that in the moving image decoder 5, the reference image indices R1 and R2 and the motion vectors mv1 and mv2 are supplied from the motion vector reconstructing section 14, whereas in the moving image encoder 6, these are supplied from the motion vector detection section 27. Further, in the moving image decoder 5, the quantization parameters qp1 and qp2 and the reference images L0 and L1 are read out from the buffer memory 15, whereas in the moving image encoder 4, these are read out from the buffer memory 24.

(Specific Example of Process for Calculating Weighting Factor)

The following description will discuss a specific example of a process for calculating weighting factors w1'' and w2'' by the weighting factor calculation section 26b''. The weighting factor calculation section 26b'' carries out one of the following calculation processes (Specific Example 3-1') to (Specific Example 3-3').

Specific Example 3-1'

The following description will discuss a first example where the weighting factor calculation section 26b'' carries out a process for calculating weighting factors w1'' and w2''. In this example, the weighting factor calculation section 26b'' calculates the weighting factors w1'' and w2'' with use of Formulae (26) and (27), as in the (Specific Example 3-1) where the weighting factor calculation section 16b' of the moving image decoder 3 carries out the process for calculating the weighting factors w1" and w2".

In the inter-predicted image Pred_Inter generated by using the weighting factors w1" and w2" thus calculated, an error caused by noise is reduced. The moving image encoder 6 can therefore generate coded data #5 having a smaller coding amount.

The moving image encoder 6, in which this example is employed, can reduce the coding amount of the coded data #5.

Specific Example 3-2'

The following description will discuss a second example where the weighting factor calculation section 26b" carries out a process for calculating weighting factors w1" and w2". In this example, the weighting factor w2 is set to be any one of values (1) to (3) with use of quantization steps QP1 and QP2, as in the (Specific Example 3-2) where the weighting factor calculation section 16b" of the moving image decoder 5 carries out the process for calculating the weighting factors w1" and w2".

The weighting factor w1" is calculated based on Formula (27) with use of the weighting factor w2", as in the (Specific Example 3-2).

In the inter-predicted image Pred_Inter generated with use of the weighting factors w1" and w2" calculated as described above, an error caused by noise is reduced. The moving image encoder 6 can therefore generate coded data #5 having a smaller coding amount.

Specific Example 3-3'

The following description will discuss a third example where the weighting factor calculation section 26b" carries out a process for calculating weighting factors w1" and w2". In this example, the weighting factor w2" is calculated based on Formula (28) as in the (Specific Example 3-3) where the weighting factor calculation section 16b" of the moving image decoder 5 carries out the process for calculating the weighting factors w1" and w2", or the weighting factor w2" is set to 0.5.

The weighting factor w1" is calculated based on Formula (27) with use of the weighting factor w2", as in the (Specific Example 3-3).

In a case where a ratio of quantization steps is 1:1, a smaller weight is applied on a reference image having a larger quantization step. This makes it possible to reduce an error caused by encoded noise that could be generated in an inter-predicted image Pred_Inter. Accordingly, the moving image encoder 6 can generate coded data #5 having a smaller coding amount.

(Additional Matter 1)

Finally, each of the blocks of the moving image decoders 1, 3, and 5 and the moving image encoders 2, 4, and 6 may be realized by way of hardware as executed by a logic circuit formed on an integrated circuit (IC chip), or may be realized by way of software as executed by a CPU (Central Processing Unit).

In the latter case, each of the decoders and encoders includes a CPU and memory devices (storage mediums). The CPU executes instructions in programs realizing the functions. The memory devices include a ROM (read only memory) which contains the programs, a RAM (random access memory) to which the programs are loaded, and a memory containing the programs and various data. The objective of the present invention can be achieved by mounting on each of the decoders and encoders a computer-readable storage medium containing program codes (executable program, intermediate code program, or source program) for each of the decoders and encoders, which is software realizing the abovementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; a semiconductor memory, such as a mask ROM/EPROM/EEPROM/flash ROM; or a logic circuit, such as a PLD (Programmable logic device) or an FPGA (Field Programmable Gate Array).

Further, each of the decoders and encoders may be arranged to be connectable to a communications network so that the program code may be delivered over the communications network. The communications network is not limited in any particular manner, provided that the communications network is capable of transmitting the program code, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular structure or kind, provided that the transfer medium is capable of transmitting the program code, and may be, for example, wired line, such as IEEE 1394, USB, electric power line, cable TV line, telephone line, or ADSL (Asymmetric Digital Subscriber Line) line; or wireless, such as infrared radiation (IrDA, remote control), Bluetooth (registered trademark), IEEE802.11 wireless, HDR (High Data Rate), NFC (Near Field Communication), DLNA (Digital Living Network Alliance), mobile telephone network, satellite line, or terrestrial digital network.

(Additional Matter 2)

As described above, the predicted image generation device of the present invention includes: motion compensated image generation means for generating, using decoded images P1 and P2 as reference images, motion compensated images mc1 and mc2 with respect to a decoded image P; weighting factor setting means for setting values of weighting factors w1 and w2 by which the motion compensated images mc1 and mc2 generated by the motion compensated image generation means are to be multiplied, respectively; and predicted image generation means for generating a predicted image Pred with respect to the decoded image P by adding an offset value to an weighted average w1×mc1+w2×mc2 of the motion compensated images mc1 and mc2 generated by the motion compensated image generation means, the weighted average w1×mc1+w2×mc2 being calculated using the weighting factors w1 and w2 that are set by the weighting factor setting means.

Furthermore, the method of the present invention for generating a predicted image includes the steps of: (i) generating, using decoded images $P_1$ and $P_2$ as reference images, motion compensated images $mc_1$ and $mc_2$ with respect to a decoded image P; (ii) setting values of weighting factors $w_1$ and $w_2$ by which the motion compensated images $mc_1$ and $mc_2$ generated in the step (i) are to be multiplied, respectively; and (iii) generating a predicted image Pred with respect to the decoded image P by adding an offset value to an weighted average $w_1 \times mc_1 + w_2 \times mc_2$ of the motion compensated images $mc_1$ and $mc_2$ generated in the step (i), the weighted average $w_1 \times mc_1 + w_2 \times mc_2$ being calculated using the weighting factors $w_1$ and $w_2$ that are set in the step (ii).

In order to solve the foregoing problem, the predicted image generation device of the present invention is designed such that the weighting factor setting means sets the value of the weighting factor $w_2$ such that a relation $0 < |w_2 - 0.5| < |tb/td - 0.5|$ is met, wherein td represents an inter-frame distance between the decoded image $P_1$ and the decoded image $P_2$ and tb represents a distance between the decoded image $P_1$ and the decoded image P.

Furthermore, in order to solve the foregoing problem, the method of the present invention for generating a predicted image is designed such that in the step (ii), the value of the weighting factor $w_2$ is set such that a relation $0 < |w_2 - 0.5| < |tb/td - 0.5|$ is met, wherein td represents an inter-frame distance between the decoded image $P_1$ and the decoded image $P_2$ and tb represents a distance between the decoded image $P_1$ and the decoded image P.

With the arrangement, the weighting factor $w_2$ is set such that the relation $0 < |w_2 - 0.5| < |tb/td - 0.5|$ is met. This allows for (1) generating a predicted image with higher accuracy than a configuration in which the value of the weighting factor $w_2$ is set to 0.5 with disregard to an inter-frame distance, and (2) generating a predicted image with a smaller amount of coding noise than a configuration in which the value of the weighting factor $w_2$ is set to tb/td in consideration of an inter-frame distance only. This yields an effect of reducing the possibility that prediction may increase the coding amount when a prediction residual obtained by subtracting a predicted image from an encoded target image is encoded.

The weighting factor w2 by which the motion compensated image $mc_2$ is to be finally multiplied should meet the condition $0 < |w_2 - 0.5| < |tb/td - 0.5|$. For example, in a configuration in which a pixel value obtained by adding an offset value to the weighted average $w_1 \times mc_1 + w_2 \times mc_2$ using integer factors $w_1$ and $w_2$ is divided by a constant C to obtain a pixel value of a predicted image, the weighting factor $w_2' = w_2/C$ should meet the condition $0 < |w_2' - 0.5| < |tb/td - 0.5|$.

The offset value may be set to 0. That is, a configuration in which no offset value is added substantially is also encompassed in the scope of the present invention.

The predicted image generation device may be arranged such that using thresholds Th1 and Th2 (Th1<0.5<Th2), the weighting factor setting means sets the value of the weighting factor $w_2$ to clip3 (Th1, Th2, tb/td), or using a coefficient $\alpha (0 < \alpha < 1)$, the weighting factor setting means sets the value of the weighting factor $w_2$ to $(tb/td - 0.5)\alpha + 0.5$, or using the coefficient $\alpha (0 < \alpha < 1)$ and thresholds Th1 and Th2 (Th1<0.5<Th2), the weighting factor setting means sets the value of the weighting factor $w_2$ to clip3 (Th1, Th2, $(tb/td - 0.5)\alpha + 0.5$). In either arrangement, by approximating the value of the weighting factor $w_2$ to 0.5, it is possible to reduce coding noise included in a predicted image.

The weighting factor setting means preferably sets the coefficient $\alpha$ in accordance with a size of a partition for which the predicted image Pred is generated. Furthermore, the weighting factor setting means preferably sets the thresholds Th1 and Th2 in accordance with a size of a partition for which the predicted image Pred is generated.

According to the inventor's findings, there is a pattern that an optimal weighting factor varies depending on the size of a partition for which a prediction image Pred is to be generated. Note that the optimal weighting factor is a weighting factor derived by a least-squares method so that a square error between an encoding target image and a decoded image is minimized. With the configuration, it is possible to approximate the weighting factors w1 and w2 to the optimal weighting factors.

In order to solve the foregoing problem, the predicted image generation device of the present invention is designed such that when $|mv_1|$ and $|mv_2|$ representing sizes of motion vectors $mv_1$ and $mv_2$ that are used in motion compensation for obtaining the motion compensated images $mc_1$ and $mc_2$, respectively, meet a relation $|mv_1| < |mv_2|$, the weighting factor setting means sets the values of the weighting factors $w_1$ and $w_2$ such that a relation $|w_1| \geq |w_2|$ is met.

Furthermore, in order to solve the foregoing problem, the method of the present invention for generating a predicted image is designed such that in the step (ii), when $|mv_1|$ and $|mv_2|$ representing sizes of motion vectors $mv_1$ and $mv_2$ that are used in motion compensation for obtaining the motion compensated images $mc_1$ and $mc_2$, respectively, meet a relation $|mv_1| < |mv_2|$, the values of the weighting factors $w_1$ and $w_2$ are set such that a relation $|w_1| \geq |w_2|$ is met.

The fact that $|mv_1|$ and $|mv_2|$ which are the sizes of the motion vector $mv_1$ and $mv_2$ meet a relation $|mv_1| < |mv_2|$ indicates that a difference between the motion compensated image mc2 and an encoding target image is larger than the motion compensated image mc1 and the encoding target image. Therefore, prediction accuracy is higher when setting the weighting factors $w_1$ and $w_2$ to meet a relation $|w_1| \geq |w_2|$ than when setting the weighting factors $w_1$ and $w_2$ to meet a relation $|w_1| < |w_2|$. Consequently, when encoding a prediction residual obtained by subtracting a prediction image from an encoding target image, a coding amount is less likely to increase by prediction.

The predicted image generation device of the present invention may be arranged such that the weighting factor setting means sets the value of the weighting factor $w_2$ to $|mv_1|/(|mv_1|+|mv_2|)$, or using thresholds Th1 and Th2 (Th1<0.5<Th2), the weighing factor setting means sets the value of the weighting factor $w_2$ to clip3 (Th1, Th2, $|mv_1|/(|mv_1|+|mv_2|)$), or the weighting factor setting means sets the value of the weighing factor $w_2$ to (1) a value less than 0.5 when a relation $|mv_1| < |mv_2| - k$ is met, (2) 0.5 when a relation $|mv_2| - k \leq |mv_1| \leq |mv_2| + k$ is met, and (3) a value more than 0.5 when a relation $|mv_2| + k < |mv_1|$ is met, k being a positive constant. Furthermore, the predicted image generation device of the present invention may be arranged such that only when an inter-frame distance between the decoded image $P_1$ and the decoded image P is equal to an inter-frame distance between the decoded image $P_2$ and the decoded image P, the weighting factor setting means sets the values of the weighting factors $w_1$ and $w_2$ in accordance with $|mv_1|$ and $|mv_2|$ which are the sizes of the motion vectors $mv_1$ and $mv_2$. Either arrangement allows increasing prediction accuracy.

In order to solve the foregoing problem, the predicted image generation device of the present invention is designed such that when quantization steps $QP_1$ and $QP_2$ used in inverse-quantization for obtaining the decoded images $P_1$ and $P_2$, respectively, meet a relation $QP_1 < QP_2$, the weighting factor setting means sets the values of the weighting factors $w_1$ and $w_2$ such that a relation $|w_1| \geq |w_2|$ is met.

Furthermore, in order to solve the foregoing problem, the method of the present invention for generating a predicted image is designed such that in the step (ii), when quantization steps $QP_1$ and $QP_2$ used in inverse-quantization for obtaining the decoded images $P_1$ and $P_2$, respectively, meet a relation $QP_1 < QP_2$, the values of the weighting factors $w_1$ and $w_2$ are set such that a relation $|w_1| \geq |w_2|$ is met.

The fact that the quantization steps $QP_1$ and $QP_2$ meet a relation $QP_1 < QP_2$ indicates that coding noise (quantization noise) included in the motion compensated image mc2 is larger than coding noise (quantization noise) included in the motion compensated image mc1. Therefore, prediction accuracy is higher when setting the weighting factors $w_1$ and $w_2$ to meet a relation $|w_1| \geq |w_2|$ than when setting the weighting factors $w_1$ and $w_2$ to meet a relation $|w_1| < |w_2|$. Consequently, when encoding a prediction residual obtained by subtracting a prediction image from an encoding target image, a coding amount is less likely to increase by prediction.

The predicted image generation device may be arranged such that the weighting factor setting means sets the value of the weighting factor $w_2$ to $QP_1/(QP_1+QP_2)$, or using thresholds Th1 and Th2 (Th1<0.5<Th2), the weighing factor setting means sets the value of the weighting factor $w_2$ to clip3 (Th1, Th2, $QP_1/(QP_1+QP_2)$), or the weighting factor setting means sets the value of the weighing factor $w_2$ to (1) a value less than 0.5 when a relation $QP_1 < QP_2-k$ is met, (2) 0.5 when a relation $QP_2-k \leq QP_1 \leq QP_2+k$ is met, and (3) a value more than 0.5 when a relation $QP_2+k < QP_1$ is met, k being a positive constant. Furthermore, the predicted image generation device may be arranged such that only when an inter-frame distance between the decoded image $P_1$ and the decoded image P is equal to an inter-frame distance between the decoded image $P_2$ and the decoded image P, the weighting factor setting means sets the values of the weighting factors $w_1$ and $w_2$ in accordance with the quantization steps $QP_1$ and $QP_2$. Either arrangement allows reducing quantization noises included in a predicted image.

A moving image decoder and a moving image encoder each including a predicted image generation device are also encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is suitably applicable to a predicted image generation device for generating a predicted image used for moving image predictive coding. Further, the present invention is suitably applicable to a moving image decoder and a moving image encoder each including such a predicted image generation device.

REFERENCE SIGNS LIST

1 Moving image decoder
16 Inter-predicted image generation section (predicted image generation device)
16a Reference value calculation section
16b Weighting factor calculation section (weighting factor setting means)
16c Motion compensation section (motion compensated image generation means)
16d Predicted image generation section (predicted image generation means)
2 Moving image encoder
26a Reference value calculation section
26b Weighting factor calculation section (weighting factor setting means)
26c Motion compensation section (motion compensated image generation means)
26d Predicted image generation section (predicted image generation means)
27 Motion vector detection section

The invention claimed is:

1. A predicted image generation device; comprising:
motion compensated image generator configured to generate motion compensated images $mc_1$ and $mc_2$ with respect to a decoded image P, wherein the motion compensated image $mc_1$ is generated from decoded image $P_1$ and the motion compensated image $mc_2$ is generated from decoded image $P_2$;
weighting factor setting unit configured to set values of weighting factors $w_1$ and $w_2$ by which the motion compensated images $mc_1$ and $mc_2$ are to be multiplied, respectively; and
predicted image generator configured to generate a predicted image Pred with respect to the decoded image P by the motion compensated images $mc_1$ and $mc_2$ and the weighting factors $w_1$ and $w_2$, wherein
the weighting factor setting unit is configured to set the value of the weighting factor $w_2$ such that a relation $0 < |w_2 - 0.5| < |tb/td - 0.5|$ is met, wherein td represents an inter-frame distance between the decoded image $P_1$ and the decoded image $P_2$ and tb represents a distance between the decoded image $P_1$ and the decoded image P, in a case that it is displayed on the display order of the decoded image $P_1$, the decoded image P and the decoded image $P_2$,
wherein using thresholds Th1 an Th2 (Th1<0.5<Th2, the weighting factor setting unit sets the value of the weighting factor $w_2$ to clip3 (Th1, Th2, tb/td).

2. The predicted image generation device as set forth in claim 1, wherein the weighting factor setting unit sets the thresholds Th1 and Th2 in accordance with a size of a partition for which the predicted image Pred is generated.

3. A moving image decoder, comprising a predicted image generation device as set forth in claim 1,
the moving image decoder generating a decoded image P by adding a prediction residual decoded from coded data to a predicted image Pred generated by the predicted image generation device referring to other decoded images $P_1$ and $P_2$.

4. A moving image encoder, comprising a predicted image generation device as set forth in claim 1,
the moving image encoder generating coded data by encoding a prediction residual obtained by subtracting, from an encoding target image, a predicted image Pred generated by the predicted image generation device referring to locally decoded images $P_1$ and $P_2$.

5. A method for generating a predicted image, comprising the steps of:
(i) generating motion compensated images $mc_1$ and $mc_2$ with respect to a decoded image P, wherein the motion compensated image $mc_1$ is generated from decoded image $P_1$ and the motion compensated image $mc_2$ is generated from decoded image $P_2$;
(ii) setting values of weighting factors $w_1$ and $w_2$ by which the motion compensated images $mc_1$ and $mc_2$ are to be multiplied, respectively; and
(iii) generating a predicted image Pred with respect to the decoded image P by the motion compensated images $mc_1$ and $mc_g$ and the weighting factors $w_1$ and $w_2$, wherein
in the step (ii), the value of the weighting factor $w_2$ is set such that a relation $0 < |w_2 - 0.5| < |tb/td - 0.5|$ is met, wherein td represents an inter-frame distance between the decoded image $P_1$ and the decoded image $P_2$ and tb represents a distance between the decoded image $P_1$ and the decoded image P, in a case that it is displayed on the display order of the decoded image $P_1$, the decoded image P and the decoded image $P_2$, wherein using thresholds Th1 and Th2 (Th1<0.5<Th2), the value of the weighting factor $w_2$ is set to clip3 (Th1, Th2, tb/td).

* * * * *